US008671136B2

(12) United States Patent
Moriwaki et al.

(10) Patent No.: US 8,671,136 B2
(45) Date of Patent: *Mar. 11, 2014

(54) SENSOR NETWORK SYSTEM AND DATA RETRIEVAL METHOD FOR SENSING DATA

(75) Inventors: Norihiko Moriwaki, Hachioji (JP); Toshiyuki Odaka, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 1013 days.

This patent is subject to a terminal disclaimer.

(21) Appl. No.: 11/727,039

(22) Filed: Mar. 23, 2007

(65) Prior Publication Data

US 2007/0198708 A1  Aug. 23, 2007

Related U.S. Application Data

(63) Continuation of application No. 11/211,467, filed on Aug. 26, 2005, now abandoned.

(30) Foreign Application Priority Data

Jan. 14, 2005  (JP) .................................. 2005-007525

(51) Int. Cl.
*G06F 15/16* (2006.01)
*G06F 15/173* (2006.01)

(52) U.S. Cl.
USPC .......................................... 709/203; 709/224

(58) Field of Classification Search
USPC ................................................ 709/203, 224
See application file for complete search history.

(56) References Cited

U.S. PATENT DOCUMENTS 6,131,119 A * 10/2000 Fukui ............................ 709/224
6,388,399 B1 * 5/2002 Eckel et al. .................... 315/312
6,509,829 B1 * 1/2003 Tuttle ............................ 340/10.1
6,982,639 B2 * 1/2006 Brackett et al. ........... 340/539.13
7,061,376 B2 * 6/2006 Wang et al. ............... 340/539.13

(Continued)

FOREIGN PATENT DOCUMENTS

CN           1547137       11/2004
JP          11296478    *   4/1998  ............. G06G 15/00

(Continued)

OTHER PUBLICATIONS

Bry et al, "Context Modeling in OWL for Smart Building Services," 2005, University of Munich, pp. 1-5.*

(Continued)

*Primary Examiner* — Thuha T. Nguyen
*Assistant Examiner* — Tariq Najee-Ullah
(74) *Attorney, Agent, or Firm* — Antonelli, Terry, Stout & Kraus, LLP.

(57) ABSTRACT

A data retrieval method for sensing data for retrieving, from user terminals, data transmitted from a plurality of sensor nodes, the data retrieval method including: a step for storing in distributed servers the data sent from the plurality of sensor nodes, a step for setting information link pointers for indicating model names previously set and link pointers of data corresponding to the model names, a step for a management server connected through a network with the distributed servers and the user terminal to accept the reference requests for data acquired from the user terminals, and a step for the management server to acquire data from the distributed servers set as the information link pointers based on the data reference request from among the data stored in the distributed servers and to respond to the user terminal.

11 Claims, 38 Drawing Sheets

(56) References Cited

U.S. PATENT DOCUMENTS

| | | | |
|---|---|---|---|
| 7,109,875 B2* | 9/2006 | Ota et al. | 340/635 |
| 7,298,259 B2* | 11/2007 | Moriwaki | 340/539.22 |
| 7,366,579 B2* | 4/2008 | Ara et al. | 700/111 |
| 7,403,114 B2* | 7/2008 | Moriwaki | 340/539.22 |
| 7,587,221 B2* | 9/2009 | Mishina et al. | 455/524 |
| 2002/0082879 A1* | 6/2002 | Miller et al. | 705/5 |
| 2004/0093239 A1 | 5/2004 | Ott et al. | |
| 2004/0103139 A1* | 5/2004 | Hubbard et al. | 709/201 |
| 2004/0177319 A1* | 9/2004 | Horn | 715/501.1 |
| 2004/0254652 A1* | 12/2004 | Ota et al. | 700/12 |
| 2006/0161645 A1* | 7/2006 | Moriwaki et al. | 709/223 |
| 2006/0173995 A1* | 8/2006 | Moriwaki | 709/224 |
| 2006/0190458 A1* | 8/2006 | Mishina et al. | 707/10 |
| 2006/0202834 A1* | 9/2006 | Moriwaki | 340/573.1 |
| 2006/0242285 A1* | 10/2006 | Moriwaki | 709/223 |
| 2007/0019452 A1* | 1/2007 | Ohkubo et al. | 363/101 |
| 2007/0083283 A1* | 4/2007 | Ara et al. | 700/111 |
| 2007/0152837 A1* | 7/2007 | Bischoff et al. | 340/573.1 |
| 2007/0171052 A1* | 7/2007 | Moriwaki | 340/539.22 |
| 2007/0198708 A1* | 8/2007 | Moriwaki et al. | 709/224 |
| 2007/0262863 A1* | 11/2007 | Aritsuka et al. | 340/539.22 |
| 2007/0282944 A1* | 12/2007 | Odaka et al. | 709/203 |
| 2007/0299956 A1* | 12/2007 | Odaka et al. | 709/223 |
| 2008/0055113 A1* | 3/2008 | Muro et al. | 340/870.16 |
| 2008/0071899 A1* | 3/2008 | Odaka et al. | 709/223 |
| 2008/0143512 A1* | 6/2008 | Wakisaka et al. | 340/504 |
| 2008/0189157 A1* | 8/2008 | Ara et al. | 705/7 |
| 2010/0131584 A1* | 5/2010 | Johnson | 709/203 |

FOREIGN PATENT DOCUMENTS

| | | | | |
|---|---|---|---|---|
| JP | 411296478 A | * | 10/1999 | ............ G06F 15/00 |
| JP | 2002-6937 | | 1/2002 | |
| JP | 2003-319550 | | 11/2003 | |
| JP | 2004-280411 | | 10/2004 | |

OTHER PUBLICATIONS

Yao et al, "The Cougar Approach to In-Network Query Processing in Sensor Networks," Sep. 2, 2002, SIGMOD Record, vol. 31, No. 3, pp. 9-18.*

Yu et al, "Towards Smart Meeting: Enabling Technologies and a Real-World Application," Nov. 12-15, 2007, ICMI, Nagoya, Aichi, Japan, ACM 2007, pp. 86-93.*

A. K. Dey, D. Salber, G. D. Abowd, and M. Futakawa, "The Conference Assistant: Combining Context-Awareness with Wearable Computing", In Proc. of the 3rd International Symposium on Wearable Computers (ISWC'99), Oct. 18-19, 1999, San Francisco, CA, pp. 21-28.*

H. Bounif, et al, "A Multimodal Database Framework for Multimedia Meeting Annotations", In proc. of the International Conference on Multi-Media Modeling (MMM'04), Jan. 5-7, 2004, Australia, pp. 17-25.*

Yoh Shiraishi and Yuichiro Anzal, "An Incremental Query Answering Mechanism for Browsing Distributed Sensor Data", Transactions of Information Processing Society of Japan, Information Processing Society of Japan, Sep. 15, 2003, vol. 44, No. SIG12(TOD19), pp. 123-138.

* cited by examiner

EVENT TABLE (ETB)

| DATA ID (DID) | EVENT ENTRY (EVT) | DATA HOLDER (DHL) |
|---|---|---|
| XXX | >A1 | Yes |
| YYY | =p1 | No |
| | . | |

SENSOR INFORMATION TABLE (STB)

| DATA ID | SENSOR TYPE | MEANING | MEASUREMENT | PLACE OF INSTALLATION | INTERVAL OBSERVATION | DATA LINK POINTER |
|---|---|---|---|---|---|---|
| 01 | IDENTIFICATION CARD | PLACE | NIL | 03 | 30s | DDS1/home/·· |
| 02 | AMBIENT TEMPERATURE | AMBIENT TEMPERATURE | AMBIENT TEMPERATURE | 03 | 60s | DDS2/home/·· |
| 03 | SIT | SIT | ON/OFF | 03 | EVENT | DDS1/home/·· |
|  |  |  |  |  |  |  |

*FIG.12*

ATTRIBUTE INTERPRETATION LIST (ATL)

1. TABLE OF NAME (ATL-m)

| RETURN VALUE | MEANING |
|---|---|
| 01 | MR. SUZUKI |
| 02 | MR. TANAKA |
| 03 | MR. YAMADA |
|  |  |

2. TABLE OF PLACE (ATL-p)

| RETURN VALUE | MEANING |
|---|---|
| 01 | OFFICE |
| 02 | MEETING ROOM A |
| 03 | ABSENT |

3. TABLE OF SEAT (ATL-s)

| RETURN VALUE | MEANING |
|---|---|
| 00 | PRESENT |
| 01 | ABSENT |

4. TABLE AMBIENT TEMPERATURE (ATL-t)

| RETURN VALUE | MEANING |
|---|---|
| x | y = f(x) |

5. TABLE OF NUMBER OF PERSONS (ATL-n)

| RETURN VALUE | MEANING |
|---|---|
| x | y = x |

*FIG.13*

| | DESCRIPTION | RETRIEVAL OF THE NUMBER OF THE PERSONS AT THE MEETING ROOM. UST |
|---|---|---|
| STEP110 | DISPLAY THE REAL-WORLD MODEL (MDL) IN THE USER TERMINAL (UST) RETRIEVAL SCREEN AND SELECT THE DESIRED ITEM. | MEETING ROOM A ─┬─ MEMBERS<br>├─ THE NUMBER OF PERSONS<br>└─ THE AMBIENT TEMPERATURE |
| STEP111 | ACCESS THE DISTRIBUTED DATA PROCESSING SERVER (DDS) AND ACQUIRE THE ATTRIBUTE AND DATA | DSK5<br>MEASURED DATA 5 |
| STEP112 | ACQUIRE THE MEANING OF THE RETURNED VALUE FROM THE ATTRIBUTE INTERPRETATION LIST (ATL). | ATTRIBUTE : THE NUMBER OF PERSONS<br>DATA : X<br>TABLE OF THE NUMBER OF PERSONS<br>ATL-n<br>\| RETURN VALUE \| MEANING \|<br>\| x \| y = x \| |
| STEP113 | DISPLAY THE MEANING INFORMATION ON THE USER TERMINAL SCREEN (UST) | UST<br>Y PERSONS ARE AT THE MEETING ROOM A. |

FIG.25

SCREEN FOR ACTION SETTING REQUEST UST

NAME [ ▼ ] MR.

[ ▼ ] WHILE
IN THE SEATED STATE
IN THE MEETING
AT HOME

[ ▼ ] INFORMS BY
POP UP
E-MAIL

[ONCE] [EVERY TIME] [REGISTRATION]

*FIG.28*

SCREEN FOR ACTION SETTING REQUEST UST

NAME [SUZUKI ▼] MR.

[IN THE SEATED STATE ▼] WHILE

[POP UP ▼] INFORMS BY

[ONCE] [EVERY TIME] [REGISTRATION]

*FIG.29*

SCREEN FOR ACTION SETTING REQUEST UST

NAME [▼] MR. [▼] WHEN
[▼]
NAME [▼] MR. [▼] WHEN

[▼] INFORM
POP UP
E-MAIL

[ONCE] [EVERY TIME] [REGISTRATION]

*FIG.34*

SCREEN FOR ACTION SETTING REQUEST UST

NAME [SUZUKI ▼] MR. [HAS TAKEN A SEAT ▼] WHEN
[AND ▼]
NAME [TANAKA ▼] MR. [HAS TAKEN A SEAT ▼] WHEN

[E-MAIL ▼] INFORM
mailto_b@xyz.com

[ONCE] [EVERY TIME] [REGISTRATION]

*FIG.35*

SEQUENCE OF AN ACTION WITH PLURALITY OF EVENTS.

SCREEN FOR ACTION SETTING REQUEST UST

NAME [SUZUKI ▼] MR.

[AT THE MEETING ROOM A ▼] WHEN

[E-MAIL ▼] INFORM BY

[mailto_b@xyz.com]

[ONCE] [EVERY TIME] [REGISTRATION]

FIG.42

DDS EVENT ACTION TABLE EATB

| DATA ID | EVENT CONTENTS | ACTION | PARAMETER | DATA HOLDER |
|---|---|---|---|---|
| X1 | X1= 02 | INFORM BY E-MAIL | E-MAIL ADDRESS mailto_b@xyz.com | No |

AN EXAMPLE: WHEN THE POSITION OF MR. SUZUKI IS AT THE MEETING ROOM A (X1 = 02)

SEND E-MAIL TO MR. B

FIG.43

SENSOR NETWORK SYSTEM AND DATA RETRIEVAL METHOD FOR SENSING DATA

CROSS REFERENCE TO RELATED APPLICATION

This is a continuation of U.S. application Ser. No. 11/211,467, filed Aug. 26, 2005 now abandoned. The entirety of the contents and subject matter of all of the above is incorporated herein by reference.

CLAIM OF PRIORITY

The present application claims priority from Japanese application P2005-7525 filed on Jan. 14, 2005, the content of which is hereby incorporated by reference into this application.

BACKGROUND OF THE INVENTION

This invention relates to a technology of using information supplied by a large number of sensors connected with the network.

The Internet and other networks have been used in recent years mainly for accessing documents, images, movies, sounds or other stored contents through search engines or previously set links. In other words, the technology of accessing the stored contents has been nearly completed.

On the other hand, a technology of transmitting the current information is streaming technology made up of continuously transmitting images captured by a camera installed at a fixed position (web camera). Lately, sensor network technology of acquiring through a network sensing data acquired from a large number of small wireless sensor nodes is developing (JP 2002-006937 A, JP 2003-319550 A, JP 2004-280411 A, U.S. Patent Application Publication 2004/0093239 Specification, and U.S. Patent Application Publication 2004/0103139 Specification). In recent years, the expectation is growing high for a sensor network system enabling to capture real-world information through sensors and using this information at a remote place through a network. While the present service on the Internet is closed to services on a virtual space, the essential difference of the sensor network from the present Internet is that it is fused with the real world. The possibility of realizing fusion with the real world enables to provide a variety of services dependent on time, location and other situation. The connection of a large variety of objects present in the real world with a network enables to realize traceability and to address to the social needs for securing "safety" in a wide sense and to the needs of "improving efficiency" in inventory control and office work.

SUMMARY OF THE INVENTION

However, although the search engine shown in the related art indicated above enables to find out the position (address) in the network concerned of the data stored in the past, there is a problem in that it is not suited to efficient retrieval of real-time information from a huge amount of sensor information connected with the network concerned and for the retrieval of changes in information.

The object of this invention is to realize a sensor network system capable of easily retrieving real-time information from a large number of sensors connected with the network concerned.

This invention includes distributed servers for storing the data transmitted from plural sensor nodes and a management server connected thereto through the first network and the user terminals, and the management server has a model table containing previously set model names and the information link pointers indicating the link pointer of the data corresponding to the model names. The data acquired from the sensors is collected only by the distributed servers, while the management server manages only the positions of collecting data from the sensors, and the data meeting the requests of the user terminals is retrieved by the distributed servers and are provided.

Therefore, according to this invention, the data acquired from the sensors is collected by the distributed servers, the locations of the sensor data are managed by the management server, the user terminals request data from the management server, and the management server acquires the data requested by the distributed servers. This will prevent the load on the management server from getting excessively large because no data will be stored in the management server even if the number of sensors turns out to be huge. Thus, it will be possible to provide easily and quickly necessary information for the users by restricting any excessive growth of the traffic on the network with which the management server, the distributed servers and the user terminals are connected while using a large number of sensors.

And it will be no longer necessary for the users to grasp the position and function of the sensors, because the users will be able to acquire the desired sensor data as useful information by simply requesting the data from the management server, and their use of information will be facilitated in a sensor network having a large number of sensors.

BRIEF DESCRIPTION OF THE DRAWINGS

FIG. 12 is a detailed description of the sensor information table;

FIG. 13 is a detailed description of the attribute interpretation list;

FIG. 25 is a detailed description of the steps required when the number of persons in the meeting room A is designated from the model binding list;

FIG. 28 is an illustration of the screen setting the actions displayed in the user terminal UST at the time of registering the action table;

FIG. 29 is also an illustration of the screen setting actions;

FIG. 34 is an illustration of the screen for setting actions displayed on the user terminal UST when a single action with plural events is to be registered;

FIG. 35 is also an illustration of the screen for setting actions displayed on the user terminal UST when a single action with plural events is to be registered;

FIG. 42 is an illustration of the screen for setting actions displayed on the user terminal UST when actions are to be registered;

FIG. 43 is a description showing entries in the event-action table of the distributed data processing server DDS;

DESCRIPTION OF THE PREFERRED EMBODIMENTS

We will describe below an embodiment of this invention with reference to drawings.

Figure 1:
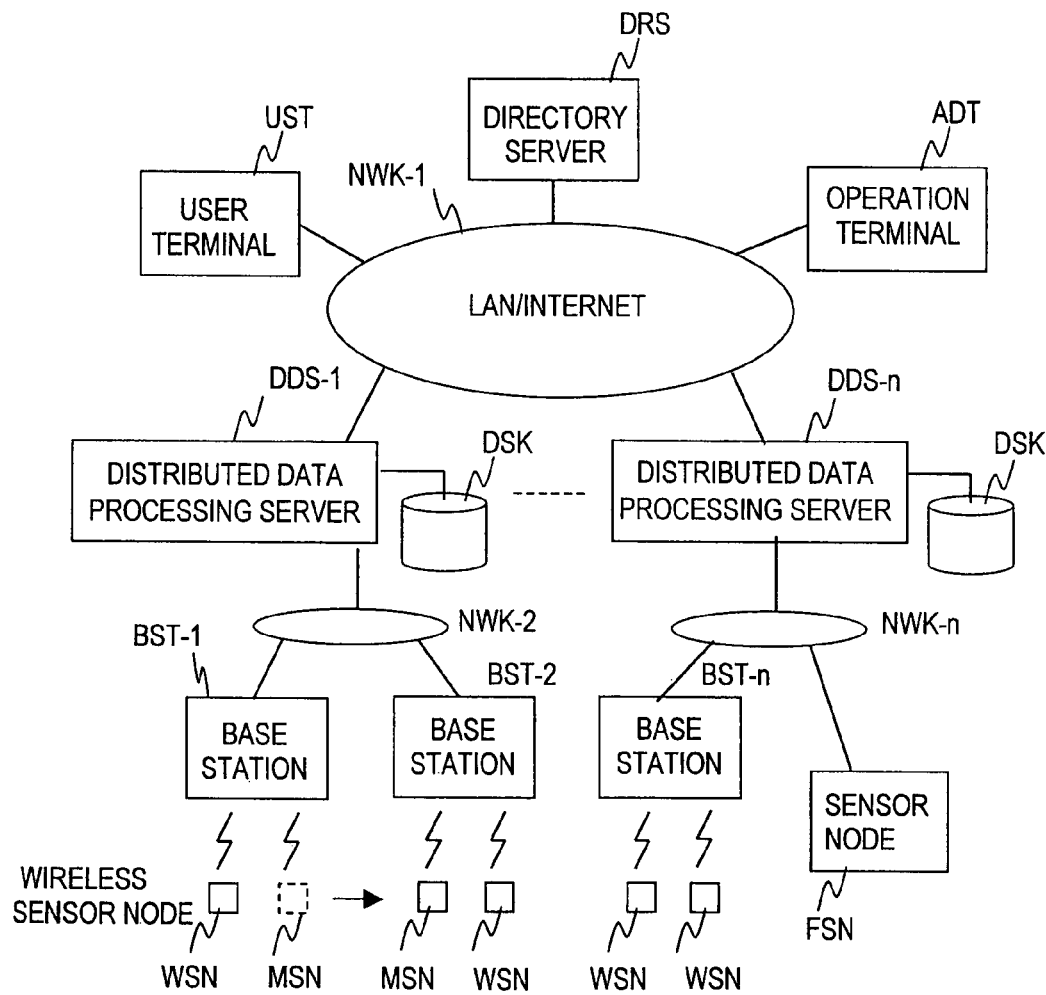
FIG. 1 is a block diagram showing the system of the sensor network representing the first embodiment of this invention.

FIG. 1 is an illustration of the basic configuration of the sensor network system showing the first embodiment of this invention.

<Outline of the System Configuration>

The wireless sensor nodes (WSN) and the wireless mobile sensor nodes (MSN) are nodes installed at predetermined positions, or fixed on a predetermined objects or persons, to gather information on the environment or information on the objects to which they are fixed, and to transmit the information to the base stations BST-1 to BST-n. The sensor nodes are made up of wireless sensor nodes WSN and MSN connected by wireless communication with the base stations BST-1 to BST-n and wired sensor nodes FSN connected by wired communication with the network NWK-n.

The wireless sensor nodes WSN installed at fixed locations, for example with their sensor sensing the surrounding situation at regular intervals, transmit the sensing information to the base station BST previously set. The wireless mobile sensor nodes MSN are designed to be mobile being carried by a person or on a car and transmit information to the nearest base stations BST. Incidentally, when the term represents the whole (generic term) wireless sensor nodes, it will be represented by the acronym WSN or MSN, and when it represents specific wireless sensor nodes, it will be represented by the acronym plus extensions such as WSN-1 to WSN-n or MSN-1 to MSN-n. Other elements will also be represented likewise without any extension when the whole generic name is indicated, and when specific elements are indicated, they will be represented by the acronym plus extensions "-1 to n".

Each base station BST-1 to BST-n is connected with one or plural wireless sensor node or nodes WSN or MSN, and each base station BST-1 to BST-n is connected with a distributed data processing server DDS-1 to BST-n for collecting data transmitted by each sensor node through the network NWK-2 to BST-n. Incidentally, the network NWK-2 to BST-n is designed to connect the base stations BST and the distributed data processing servers (distributed servers) DDS. The distributed data processing server DDS may vary the number of connections depending on the required scale of the system.

Each distributed data processing server DDS-1 to DDS-n having a disk drive DSK for storing the data received from the wireless and wired sensor nodes (simply referred to hereinafter as "sensor node"), a CPU (not shown) and a memory executes a specified program, collects measured data transmitted by the sensor nodes as described below, and makes various steps such as data storage, data processing, and transmission of notices and data to a directory server (management server) DRS or other servers through the network NWK-1 according to the conditions previously prescribed. Incidentally, the network NWK-1 is formed of a LAN, the Internet and the like.

The data collected from the sensor nodes contains the proper ID for identifying the sensor nodes and numerical data. The numerical data may come with a time stamp to indicate when the data is sensed. However, the collected data as it is not in a form easily understandable for the user (user of the user terminal UST and the like). Therefore, the directory server DRS converts the output data of the sensor node into a real-world model that users can understand (person, object, state and the like) based on a definition previously set and present the result to the user.

The data relating to the sensor nodes belonging to the base station BST in the network NWK-2 to NWK-n to which the distributed data processing servers DDS-1 to DDS-n are connected themselves and the data transmitted by the wireless mobile sensor nodes MSN having moved from other base stations BST are collected and are converted as described above. And the wired sensor nodes FSN may be connected with the distributed data processing servers DDS-1 to DDS-n. Obviously the wired sensor nodes FSN may be connected with the base stations BST, and the base stations BST may manage the wired sensor nodes FSN in the same way as the wireless sensor nodes.

The network NWK-1 is connected with a directory server DRS for managing the real-world models related with the sensing information transmitted from the distributed data processing servers DDS, user terminals UST using the information of this directory server DRS, and an operation terminal ADT for setting and operating the directory server DRS, the distributed data processing server DDS and the base stations BST, and the sensor nodes. Incidentally, separate operation terminals may be provided respectively for the sensor managers who manage the sensor nodes and the service managers who manage the service of the sensor network.

The directory server DRS provided with a CPU (not shown), a memory and a storage system executes the specified program and manages the objects related with meaningful information as described below.

In other words, when a user requests an access to the real-world model through the user terminal UST, the directory server DRS accesses the distributed data processing servers DDS-1 to DDS-n having measured data corresponding to the real-world model, acquires the corresponding measured data, converts the sensing data if necessary into a form understandable for the users and display the result on the user terminals UST.

Figure 2:
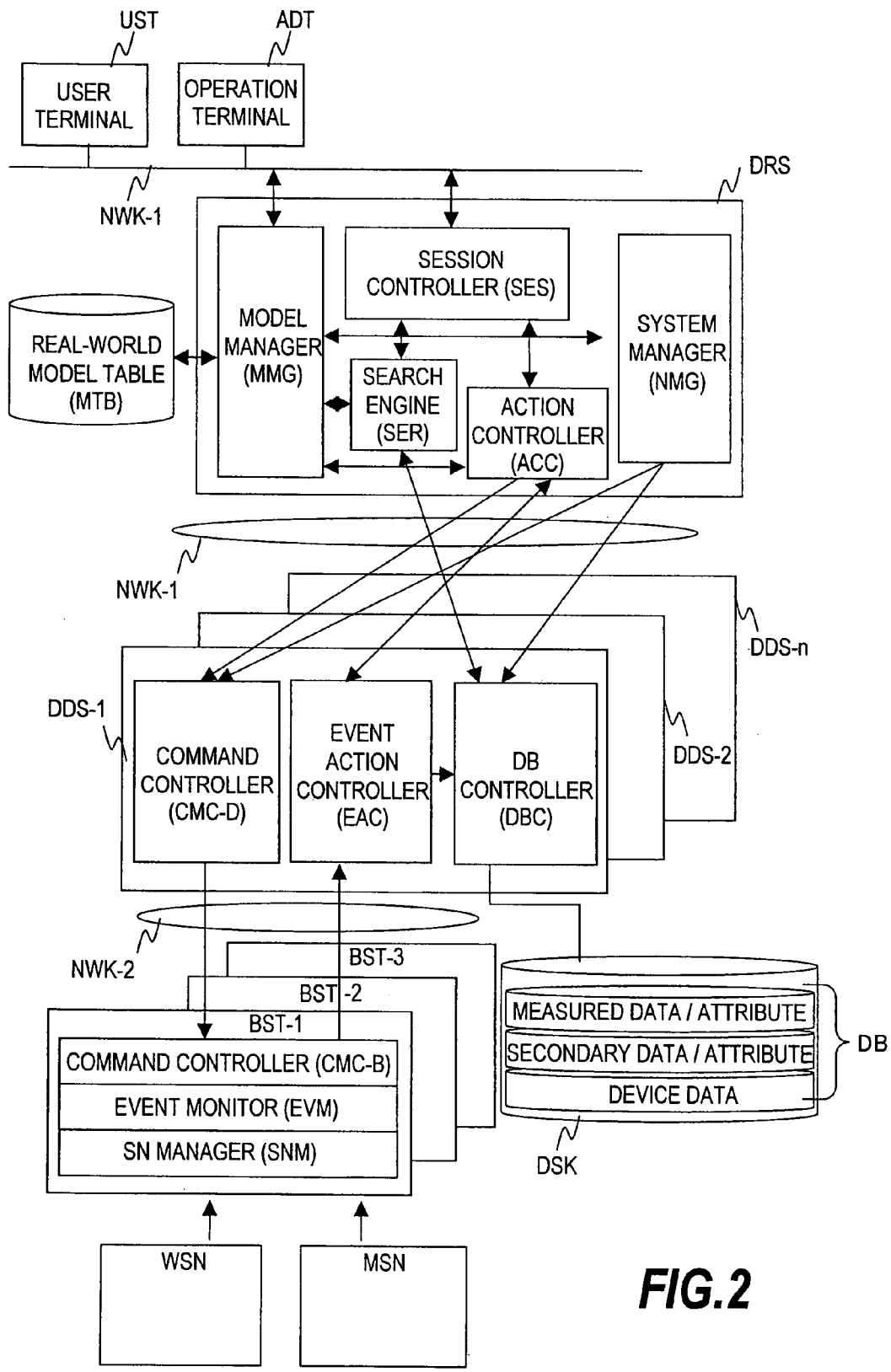
FIG. 2 is a functional block diagram of the sensor network.

FIG. 2 is a functional block diagram of the sensor network shown in FIG. 1. In order to simplify the description, we will show here the structure of the distributed data processing server DDS-1 only from among the distributed data processing servers DDS-1 to DDS-n shown in FIG. 1 and only the structure of the base station BST-1 from among the base stations BST-1 to BST-n connected with the distributed data processing servers DDS-1. Other distributed data processing servers DDS and other base stations BST are similarly structured.

We will now describe various units in details below.

<Base Station BST>

The base station BST-1 for collecting data from the wireless sensor nodes WSN, MSN and wired sensor nodes FSN (hereinafter referred to as "sensor nodes") includes a command controller CMC-B, a sensor node manager SNM, and an event monitor EVM. Incidentally, the sensor nodes transmit measured data by attaching the previously set ID thereto.

The command controller CMC-B exchanges commands with the command controller CMC-D of the distributed data processing server DDS-1 as described below. For example, in response to a command issued by the distributed data processing server DDS-1, the command controller CMC-B sets the parameters of the base station BST-1 and transmits the state of the base station BST-1 to the distributed data processing server DDS-1. Or it sets the parameters of the sensor nodes managed by the base station BST-1 and transmits the state of the sensor nodes to the distributed data processing server DDS-1.

The sensor node manager SNM maintains the management information (operating condition, residual power and the like) of the sensor nodes under its management. And when an inquiry has been received from the distributed data processing server DDS-1 on sensor nodes, the sensor node manager SNM provides the management information instead of and for each sensor node. The sensor nodes can reduce their own processing load by assigning the processing load related to management to the base station BST and can limit any unnecessary power consumption.

When the event monitor EVM has detected any anomaly, the sensor node manager SNM updates the management information of sensor nodes and informs the distributed data processing server DDS-1 of any anomaly that occurred in any of the sensor nodes. An anomaly in sensor node includes the case of no response from the sensor nodes, the case where the power supply to the sensor nodes has fallen below the previously set value and other situations in which the sensor node function is interrupted or comes to a halt.

Upon receipt of a command (setting of output timing) from the command controller CMC-D to the sensor nodes, the sensor node manager SNM transmits this command to the sensor nodes to set the output timing, and upon receipt of a notice showing the completion of setting from the sensor nodes, the sensor node manager SNM updates the management information of sensor nodes. Incidentally, the output timing of sensor nodes indicates, for example, the interval between cyclical transmissions of data from the wireless sensor nodes WSN to the base station BST-1.

The base station BST manages the previously set wireless sensor nodes WSN, MSN and wired sensor nodes FSN under its control, and transmits the data measured by each sensor node to the distributed data processing server DDS.

<Distributed Data Processing Server DDS>

The distributed data processing server DDS-1 includes a disk drive DSK used for a database DB, a command controller CMC-D described below, an event action controller EAC, and a database controller DBC.

The command controller CMC-D communicates with the base station BST and the directory server DRS described below to transmit and receive commands and the like.

Upon receipt of measured data from the sensor nodes through the base station BST, the event action controller EAC acquires ID corresponding to the measured data or data ID, reads the rule of event corresponding to the data ID from the table described below (event table ETB in FIG. 10) and judges whether an event corresponding to the value of the measured data has occurred or not. And the event action controller EAC takes an action corresponding to the occurrence of an event corresponding to the data ID. When the sensor node has only one sensor, the sensor node ID for identifying the sensor node can be used for the data ID.

And the actions taken include the transformation of measured data (raw data) into secondary data (processed data) based on the rule set in advance by the user and the like for each data ID, the storage of the measured data and secondary data into the database DB through the database controller DBC, or the notification of the same to the directory server DRS and the like.

According to the present embodiment, as FIG. 1 shows, the disposition of plural distributed data processing servers DDS concentrating regionally (or locally) some of them against plural base stations BST enables to process separately at different locations information supplied by a large number of sensor nodes. For example, in offices, a distributed data processing server DDS may be installed on each floor, and in factories a distributed data processing server DDS may be installed in each building.

The disk drive DSK of the distributed data processing server DDS-1 stores as databases DB the measured data of the sensor nodes WSN, MSN, and FSN that has been received from the base stations BST, secondary data that has been acquired by processing this measured data, and device data relating to the base stations BST.

And the database controller DBC of the data processing server DDS-1 stores the measured data outputted by the sensor nodes transmitted by the event action controller EAC in its database DB. And if necessary it stores the secondary data produced by value processing the measured data or fusing with other data in its database DB. Incidentally, it updates device data as required from time to time in response to the request of operation terminal ADT and the like.

<Directory Server DRS>

The directory server DRS for managing plural distributed data processing servers DDS includes a session controller SES for controlling communications from the user terminals UST or operation terminals ADT connected through the network NWK-1 as stated later on, a model manager MMG, a real-world model table MTB, a system manager NMG, an action controller ACC and a search engine SER.

The model manager MMG manages by using a real-world model list MDL having set the correlation between the real-world models (objects) understandable for the user and the measured data or secondary data collected by the distributed data processing servers DDS from the sensor nodes set in the real-world model table MTB.

The directory server DRS also manages the position information of location (URL and other links) of measured data or secondary data corresponding to the real world model. In other words, the user can access directly the constantly changing measurement information of the sensor nodes by designating the real world model. While the measured data of the sensor nodes and secondary data increase as the time passes, the real-world model information remains unchanged in its dimension even after the passage of the time, and only its contents change. We will describe the details of this real-world model later on.

Incidentally, the real-world model table MTB is stored in the predetermined storage system (not shown in any figure) of the directory server DRS.

The action controller ACC of the directory server DRS communicates with the event action controller EAC and the command controller CMC-D of the distributed data processing servers DDS, and receives the event action setting requests outputted by the user terminals UST and the operation terminals ADT. Then it analyzes the details of the event or action it had received, and sets the distribution of functions between the directory server DRS and the distributed data processing servers DDS-1 to DDS-n corresponding to the analysis results. Incidentally, an action or an event may sometimes relate not only to a distributed data processing server DDS but also plural distributed data processing servers DDS-1 to DDS-n.

The search engine SER refers the real-world model table MTB based on the search requests for the objects received by the session controller SES, and searches the database DB of the distributed data processing servers DDS.

If the search request is a query, the search engine SER relates the database DB to the contents of the query, converts the query to the SQL (structured query language) and carries out the search. Incidentally, the database DB to be searched may sometimes cover plural distributed data processing servers DDS.

And this query relates to "the acquisition of the latest data (snapshot/stream)." Incidentally, "the acquisition of the latest data (stream)" relates to the action setting of the action controller ACC. In other words, it is enough to set an action in the event action controller EAC of the pertinent distributed data processing server DDS in such a way that the pertinent data may always be transferred to the user terminal.

Now, the system manager NMG globally manages the distributed data processing servers DDS connected with the network NWK-1 and constituting the sensor network, the base stations BST connected with the distributed data processing servers DDS and the sensor nodes connected with the base stations BST.

The system manager NMG provides an interface related with the registration and retrieval of the distributed data processing servers DDS, the base stations BST and the sensor nodes to the operation terminals ADT and the like, and manages the condition of each device and the condition of the sensor nodes.

The system manger NMG may issue commands to the distributed data processing servers DDS, the base stations BST and the sensor nodes and manages the resources of the sensor network by these commands. By the way, the sensor nodes receive commands from the system manager NMG through the command controller CMC-B of the base station BST and the base stations BST receive commands from the system manager NMG through the command controller CMC-D of the distributed data processing server DDS.

Incidentally, the commands issued by the system manager NMG through the command controller CMC-D include reset, set parameters, delete data, transmit data, set standard-type event-action, and the like.

<An Example of Sensor Node>

Figure 3:
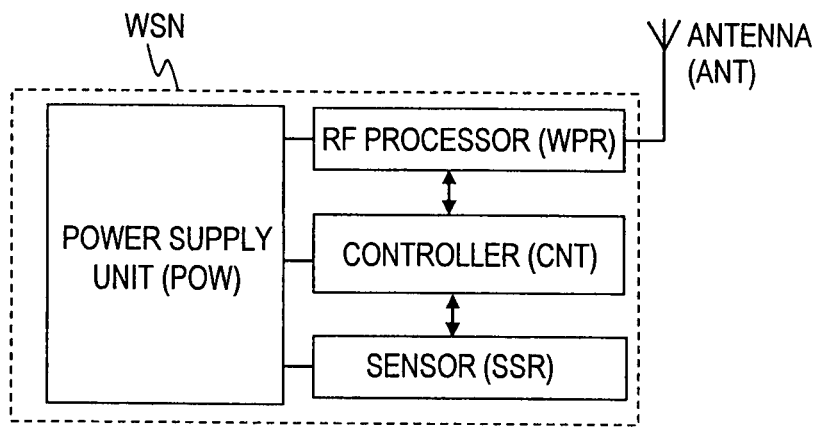
FIG. 3 is a block diagram showing an example of wireless sensor node WSN.
Figure 4:
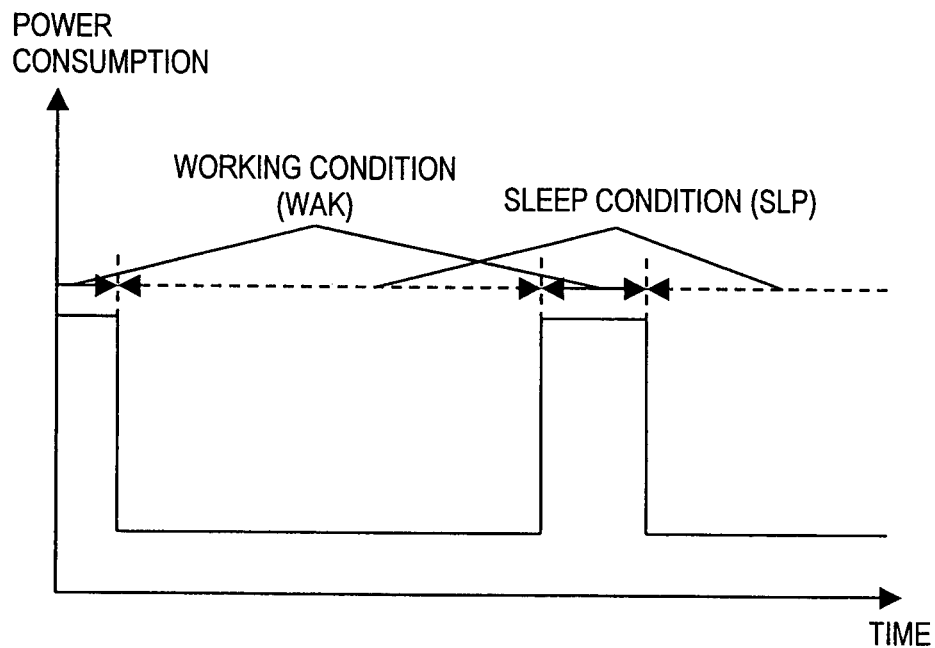
FIG. 4 is a graph showing the operating condition of the wireless sensor node and shows the relationship between time and power consumption.
Figure 5:
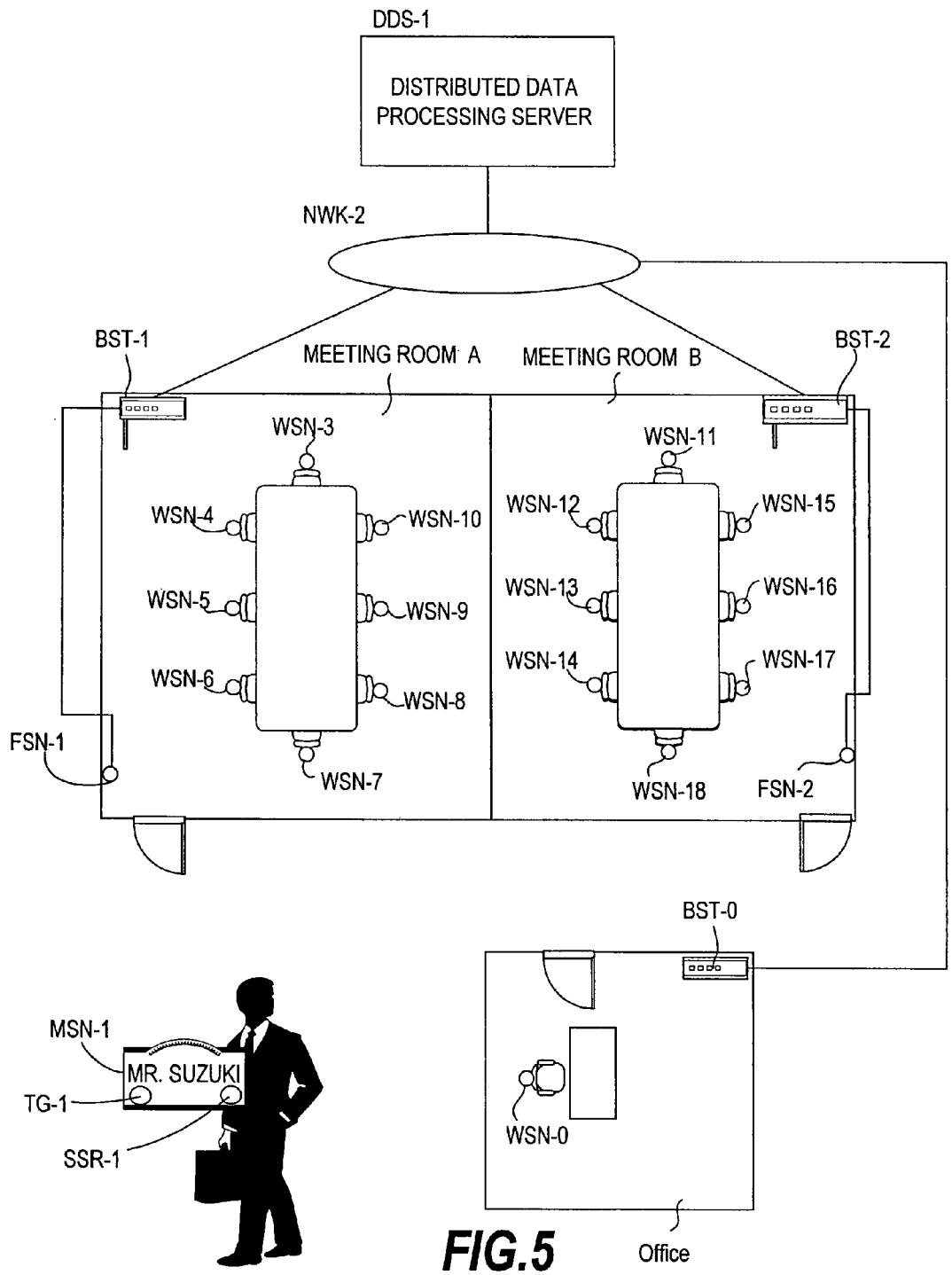
FIG. 5 is an illustration showing an example of the disposition of wireless sensor nodes.

An example of sensor node will be shown in FIGS. 3 to 5.

FIG. 3 is a block diagram showing an example of wireless sensor node WSN. A wireless sensor node WSN includes a sensor SSR for measuring quantity of state (temperature, pressure, position and the like) and changes in the quantity of state (low temperature/high temperature, low pressure/high pressure, and the like) of the object of measurement, a controller CNT for controlling the sensors SSR, an RF processor WPR for communicating with the base stations BST, a power supply unit POW for supplying power to each block SSR, CNT and WPR, and an antenna ANT for transmitting and receiving RF signals.

The controller CNT reads the measured data of the sensors SSR at a previously set cycle or irregularly, adds a previously set sensor node ID to these measured data and transmits the same to the RF processor WPR. The measured data may sometimes include time information on the sensing as a time stamp. The RF processor WPR transmits the data received from the controller CNT to the base stations BST.

The RF processor WPR transmits the commands and the like received from the base stations BST to the controller CNT, and the controller CNT analyzes the commands received and proceeds to the predetermined processing (e.g., change of setting and the like). The controller CNT transmits the information on the remaining power (or amount of electric charges made) of the power supply unit POW to the base stations BST through the RF processor WPR. In addition, the controller CNT itself monitors the remaining power (or the amount of electric charges) of the power supply unit POW, and when the remaining power has fallen below the previously set value, the controller CNT may warn the base stations BST that power supply is about to run out.

In order to conduct extended-time measurements with a limited supply of power, as shown in FIG. 4, the RF processor WPR is operated intermittently to reduce power consumption. During its sleep state SLP as shown in the FIG. 4, the controller CNT stops driving the sensors SSR and switches from a sleep state to an operating state at a predetermined timing to drive the sensors SSR and transmits the measured data.

FIG. 3 shows the case wherein a wireless sensor node WSN has only one sensor SSR. However, plural sensors SSR may be disposed thereon. Alternatively, a memory having a proper identifier ID may be used in the place of sensors SSR for a wireless sensor node WSN to be used as a RFID tag.

In FIGS. 3 and 4, a battery may be used for the power supply unit POW, or solar cell, vibrational energy generation or other similar energy generation units may be used. The wireless mobile sensor node MSN may be designed in the same way as shown in FIGS. 3 and 4.

FIG. 5 is a detailed illustration showing an example of sensor nodes connected with the distributed data processing server DDS-1 shown in FIGS. 1 and 2 above.

In the present embodiment, an example of installing sensor nodes in the office, the meeting room A and the meeting room B is shown.

In the office, a base station BST-0 is installed, and a wireless sensor node WSN-0 having a pressure switch as a sensor SSR is installed on the chair in the office. The wireless sensor node WSN-0 is set to communicate with the base station BST-0.

A base station BST-1 is installed in the meeting room A, and the wireless sensor nodes WSN-3 to WSN-10 respectively having a pressure switch as a sensor SSR are installed on the chairs of the meeting room A. Furthermore, the meeting room A is provided with a wired sensor node FSN-1 having a temperature sensor, and the wired sensor node FSN-1 is connected with the base station BST-1. Each of the wireless sensor nodes WSN-3 to WSN-10 and the wired sensor node FSN-1 are set in such a way that they can communicate with the base station BST-1.

Similarly a base station BST-2 is installed in the meeting room B, and the wireless sensor nodes WSN-11 to WSN-17 respectively having a pressure switch as a sensor SSR and the wired sensor node FSN-2 having a temperature sensor are installed on the chairs of the meeting room B. These sensor nodes are connected with the base station BST-2.

The employees using the office, the meeting rooms A and B are required to wear a wireless mobile sensor node MSN-1 serving as their identification card. The wireless mobile sensor node MSN-1 is constituted as an identification card with a temperature sensor SSR-1 for measuring the temperature of the employee (or the ambient temperature) and a tag TG-1 storing the proper identifier of the employee (employee ID). The wireless mobile sensor node MSN-1 can transmit the employee ID and the measured temperature data to the base stations BST-0, 1 or 2.

<Outline of the Operation of the Sensor Network>

Figure 6:
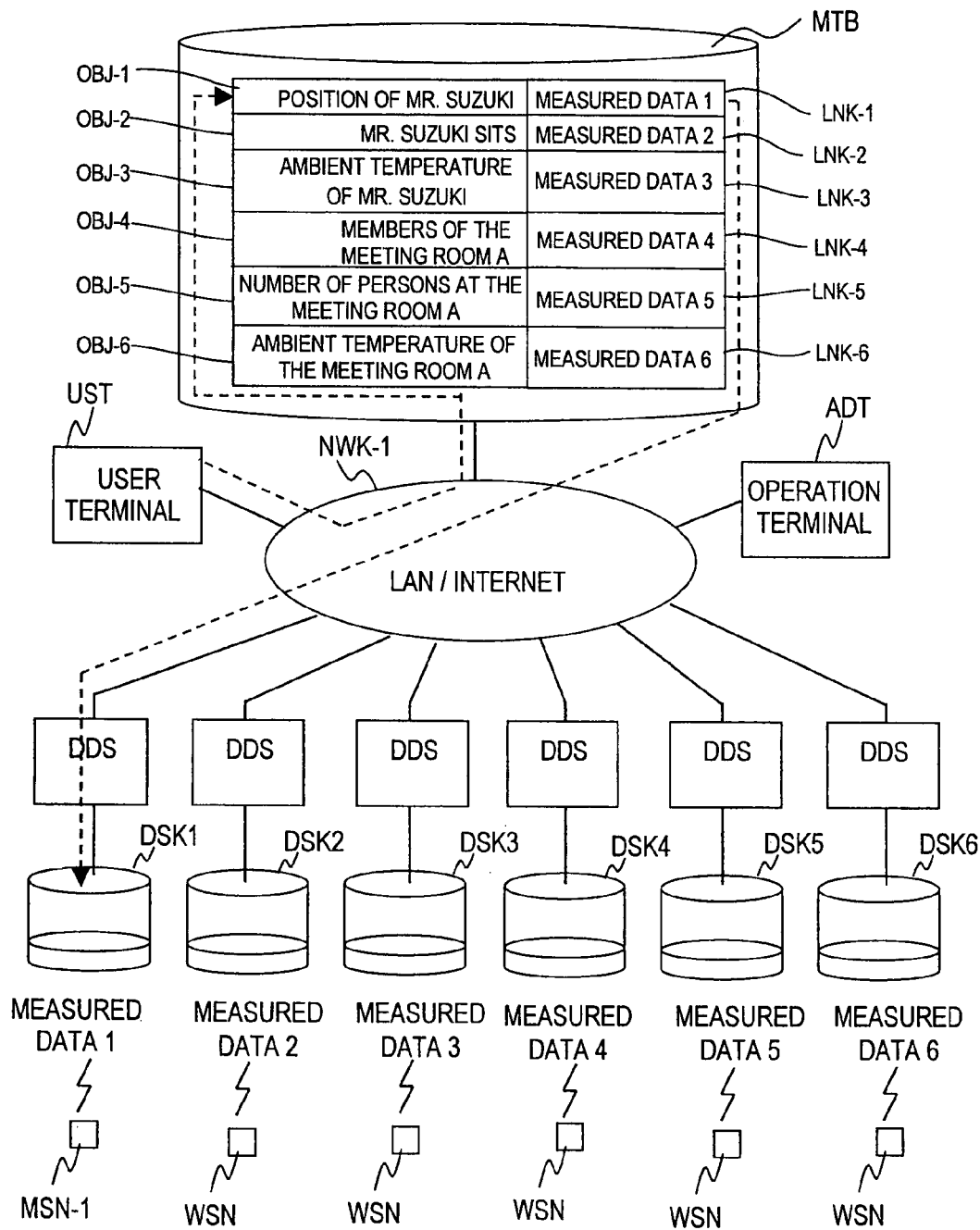
FIG. 6 is a block diagram showing the relationship between the objects and the measured data of sensor nodes, and shows the starting time of measurement.
Figure 7:
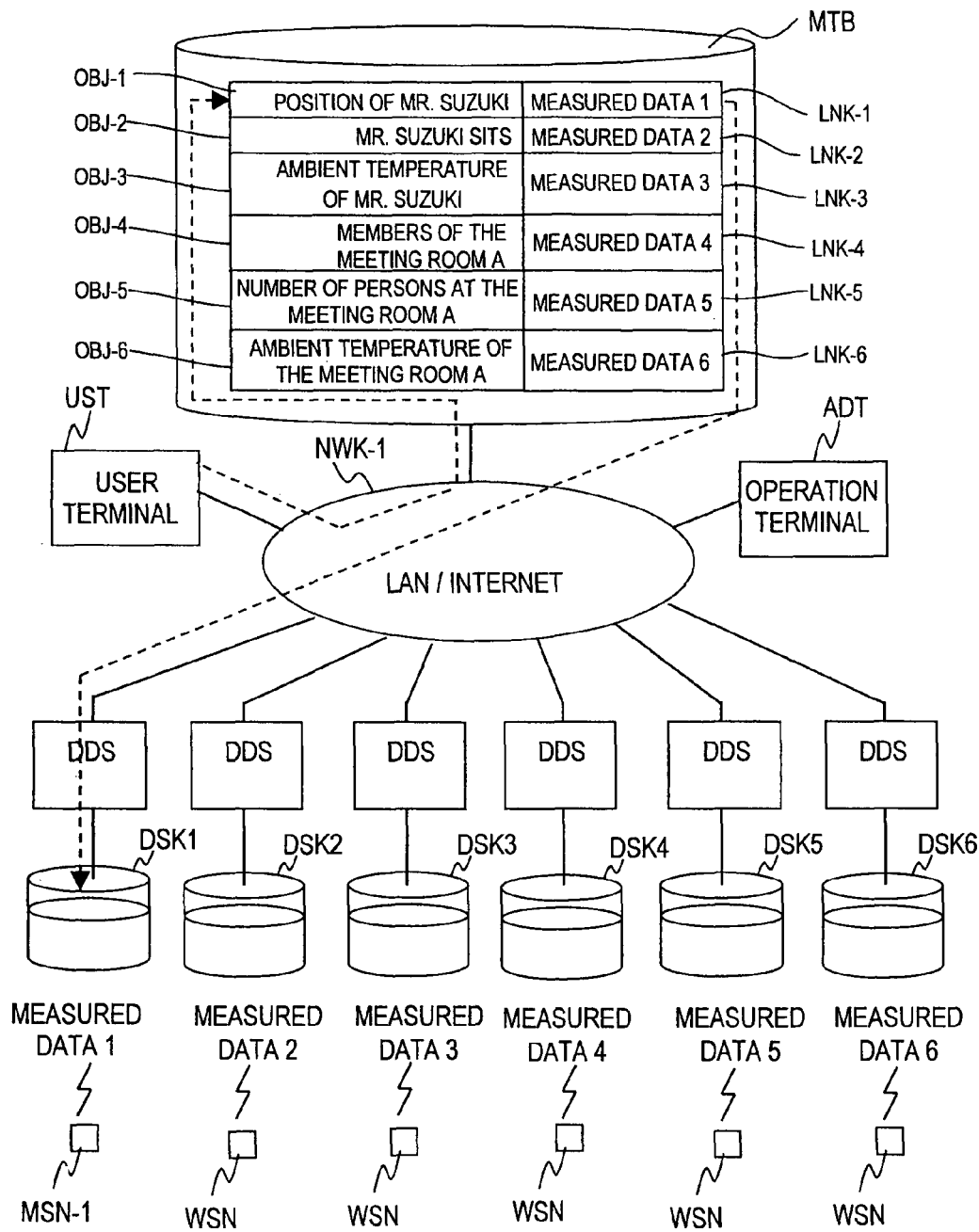
FIG. 7 is a block diagram showing the relationship between the objects and the measured data of sensor nodes, and shows the state when a predetermined time has passed from the start of the measurement.
Figure 8:
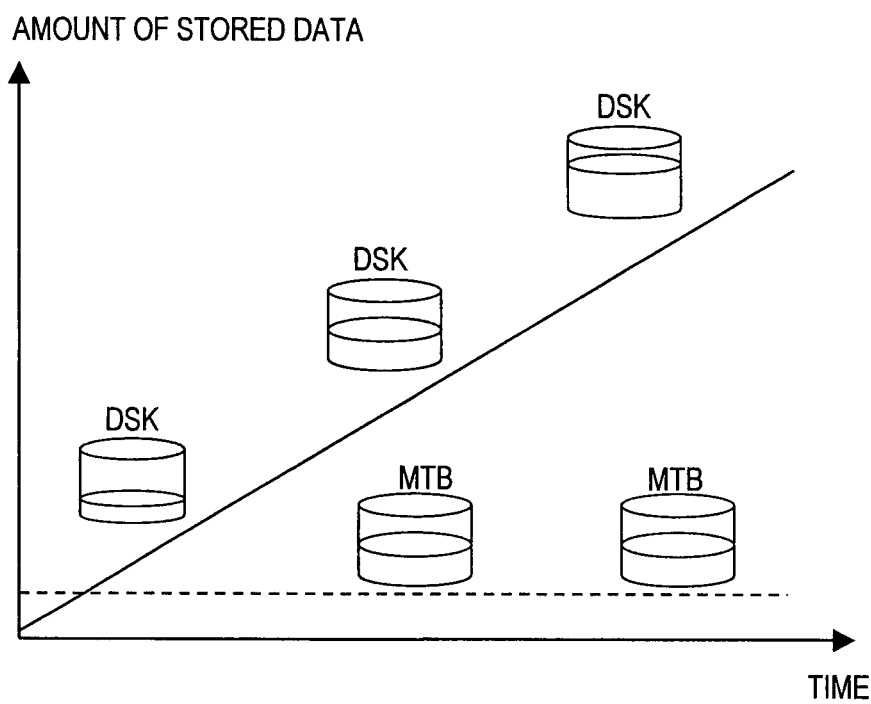
FIG. 8 is a graph showing the relationship between the data amount of the objects, the amount of measured data of the sensor nodes and time.

We will then describe the outline of the operation of the sensor network shown in FIGS. 1 to 5 with reference to FIGS. 6 to 8.

FIG. 6 is a block diagram showing the relationship between the objects representing the specific forms of the real-world model and the measured data of the sensor nodes and shows the beginning of measurement, and FIG. 7 shows the situation prevailing after the passage of a predetermined period of time from the situation shown in FIG. 6.

In FIG. 6, the directory server DRS has formed in advance the following objects as the real-world model, and defines the same in the real-world model list MDL of the real-world model table MTB. Here, we assume that Mr. Suzuki is an employee using the office or the meeting rooms A and B shown in FIG. 5, and that he is wearing a wireless mobile sensor node MSN-1 shown in FIG. 5 and FIG. 6.

As the sensor information table STB of FIG. 12 shows, the sensor information table is defined in such a way that the measured data (e.g. temperature) and position information of each sensor node MSN may be stored in the distributed data processing server DDS designated as the data link pointer. Here, the position information of the sensor node MSN may be acquired as the ID information of the base station BST that detects the sensor node MSN.

And the real-world model list MDL of the real-world model table MTB contains a definition that the object representing the position of Mr. Suzuki (OBJ-1) is an object actually located in the link pointer named measured data 1 (LINK-1), and thus manages the relationship of correspondence between the real-world model and the actual data position.

In other words, the object representing the position of Mr. Suzuki (OBJ-1) in the real-world model list MDL is related with the storage position of the distributed data processing server DDS corresponding to the measured data 1 (LINK-1). In FIGS. 6 and 7, the position information given by the wired mobile sensor node MSN-1 indicating the position of Mr. Suzuki (defined, e.g., as "connected with which base station BST") is stored in the disk drive DSK 1 of the distributed data processing server DDS.

When viewed from the user terminal UST, the value of Mr. Suzuki's position (OBJ-1) seems to be stored in the real-world model table MTB of the directory server DRS. However, the actual data is stored not in the directory server DRS, but in the disk drive DSK 1 previously set of the distributed data processing server DDS.

The object representing the taking seat of Mr. Suzuki (OBJ-2) will be defined in the real-world model table MTB in such a way that the seating information acquired by the pressure switch (WSN-0) installed on the chair in the office may be stored in the measured data 2 (LINK-2). In addition, the distributed data processing server DDS corresponding to the measured data 2 and the storage position will be defined. In FIGS. 6 and 7, the seating information acquired from the MSN-1 and the wireless sensor node WSN will be stored in the disk drive DSK 2 of the distributed data processing server DDS.

The object representing Mr. Suzuki's temperature (OBJ-3) will be defined in the real-world model table MTB in such a way that the temperature measured by the temperature sensor SSR-1 of the wireless mobile sensor node MSN-1 will be stored in the measured data 3 (LINK-3). In addition, the distributed data processing server DDS corresponding to the measured data 3 and the storage position will be defined. In FIGS. 6 and 7, the temperature data acquired from the MSN-1 will be stored in the disk drive DSK 3 of the distributed data processing server DDS.

The object representing the members of the meeting room A (OBJ-4) will be defined in the real-world model table MTB in such a way that the name of employee acquired from the information of the wireless mobile sensor node MSN connected with the base station BST-1 of the meeting room A may be stored in the measured data 4 (LINK-4). If no pressure switch (WSN-3 to WSN-10) is used, the number of persons in the meeting room A may be calculated from the number of the wireless mobile sensor nodes MSN detected by the base station BST-1 in the meeting room A. Further, the distributed data processing servers DDS corresponding to the measured data 4 and the storage position will be defined. In FIGS. 6 and 7, the individual information acquired from the wired mobile sensor node MSN of each employee will be stored in the disk drive DSK 4 of the distributed data processing server DDS.

The object representing the members of the meeting room A (OBJ-5) will be defined in the real-world model table MTB in such a way that the number of persons acquired from the pressure switches (WSN-3 to WSN-10) in the meeting room A may be stored in the measured data 5 (LINK-5). And the distributed data processing server DDS corresponding to the measured data 5 and the storage position will be defined. In FIGS. 6 and 7, the seating information from the wired sensor nodes WSN-3 to WSN-10 will be stored in the disk drive DSK 5 of the distributed data processing server DDS.

The object representing the temperature of the meeting room A (OBJ-6) will be defined in the real-world model table MTB in such a way that the temperature measured by the wired sensor node FSN-1 in the meeting room A may be stored in the measured data 6 (LINK-6). And the distributed data processing server DDS corresponding to the measured data 6 and the storage position will be defined. In FIGS. 6 and 7, the temperature data from the FSN-1 will be stored in the disk drive DSK 6 of the distributed data processing server DDS.

In other words, each object OBJ defined in the real-world model table MTB stores the link pointer (LINK) corresponding to the measured data, and although the object data as seen from the user terminal UST may seem to exist in the directory server DRS, the actual data is stored in the distributed data processing server DDS.

In the link pointer of the information LINK, the storage position of the measured data measured by the sensor nodes, the secondary data obtained by converting the measured data into an understandable form for the user and the other data usable for the user are set. The measured data from the sensor nodes is collected by each distributed data processing server DDS, and if an event/action is set as described later on, the measured data will be processed and will be stored in the predetermined distributed data processing server DDS as secondary data.

The data from the sensor nodes will be actually collected and processed by the distributed data processing servers DDS, and the directory server DRS will manage the real-world model, the link pointer of information and the definition of the sensor nodes.

In this way, the users of the user terminals UST will not be required to learn the location of the sensor nodes, they will be able to obtain the desired data corresponding the measurement (or the secondary data) of the sensor node by retrieving the objects OBJ.

And as the directory server DRS will manage the link pointer of each object OBJ, and the actual data will be stored and processed in the distributed data processing servers DDS, even if the number of sensor nodes turns out to be huge, it will be possible to prevent the distributed data processing servers DDS from being overloaded. In other words, even when a large number of sensor nodes are employed, it will be possible to suppress the traffic load on the network NWK-1 connecting the directory server DRS, distributed data processing servers DDS and the user terminals UST.

In FIG. 7 showing the state after the lapse of a predetermined period of time after the state of FIG. 6, the actual measured data transmitted from the sensor nodes will be written into the disk drives DSK-1 to DSK-6 of the distributed data processing servers DDS, and the amount of data will increase as the time passes.

On the other hands, the amount of information stored in the link pointers LINK-1 to LINK-6 corresponding to the objects OBJ-1 to OBJ-6 set in the model list MDL of the real-world model table MTB of the directory server DRS remains unchanged even with the passage of time, and the contents of information indicated by the link pointers LINK-1 to LINK-6 change.

In short, the relationship between the amount of information of the objects OBJ-1 to OBJ-6 managed by the directory server DRS, the amount of data of the measured data 1 to 6 managed by the distributed data processing servers DDS and time is that, while the amount of data of the objects is constant as shown in FIG. 8, the amount of measured data increases as the time passes.

For example, when a base station BST is connected with hundreds of sensor nodes, a distributed data processing server DDS is connected with several base stations BST, and a directory server DRS is connected with tens of distributed data processing servers DDS, the total number of sensor nodes will be several thousands or several tens of thousands. Supposing that each sensor node transmits data every minute, hundreds or thousands of measured data pieces will be sent every second to the distributed data processing server DDS, the presence of an event will be judged, and if an event has occurred, a predetermined action, such as a notice, data processing or other action, will be taken. If these actions are to be carried out by a centralized server, the load of the server itself or that of the network for connecting with the server will be very large. In addition, the collected data or the secondary data must be provided to the user terminals in response to users. Therefore, the load of the server or that of the network will further increase.

To avoid the load increase, the server function is divided on DRS and DDS. The directory server DRS receives access from the user terminals UST and manages the information link pointers of the sensor nodes. The distributed data processing servers DDS manage plural base stations BST, collect and process the data from the sensor nodes.

The information from the sensor nodes is distributed among and collected by plural distributed data processing servers DDS, and each distributed data processing server DDS respectively stores or processes the data. In this way, the collection and processing of data from a large number of sensor nodes is distributed and thus the concentration of load into specific servers can be avoided.

On the other hand, the directory server DRS manages collectively (in a centralized way) the link pointers LINK of information acquired from the measured data of the sensor nodes and provides the user terminals UST with the correspondence relationship between the objects and the link pointers LINK. Users acquire useful information from the data link pointers by inquiring the directory server DRS on the target objects even if they have no information regarding the physical position of sensor nodes. In other words, the centralized management of information link pointers by the directory server DRS enables the user terminals UST to acquire the measured data or secondary data concerning the target sensor node by accessing the directory server DRS without sensor node information.

The directory server DRS converts the data acquired from the distributed data processing servers DDS into information understandable for the users based on the attribute interpretation list ATL and provides the result to the user terminals UST.

The objects stored in the directory server DRS are set and modified depending on the system structure, and do not change chronologically as the measured data retrieved by the sensor nodes does. Therefore, the part that controls collectively the objects is not affected by chronological changes in the load of the measured data. As a result, the direct exchange of the sensor node data with the distributed data processing servers DDS is restricted, and thus the possibility that the overload of the network NWK-1 connected with the directory server DRS is suppressed.

FIGS. 6 and 7 show the case where separate distributed data processing servers DDS are respectively connected with a disk drive DSK. However, as shown in FIG. 5, a distributed data processing server DDS may be provided and plural disk drives DSK may be connected therewith. It is also possible to connect the disk drives with grouped plural distributed data processing servers DDS.

<Relationship Between the Measured Data and the Event>

Figures 9, 10:
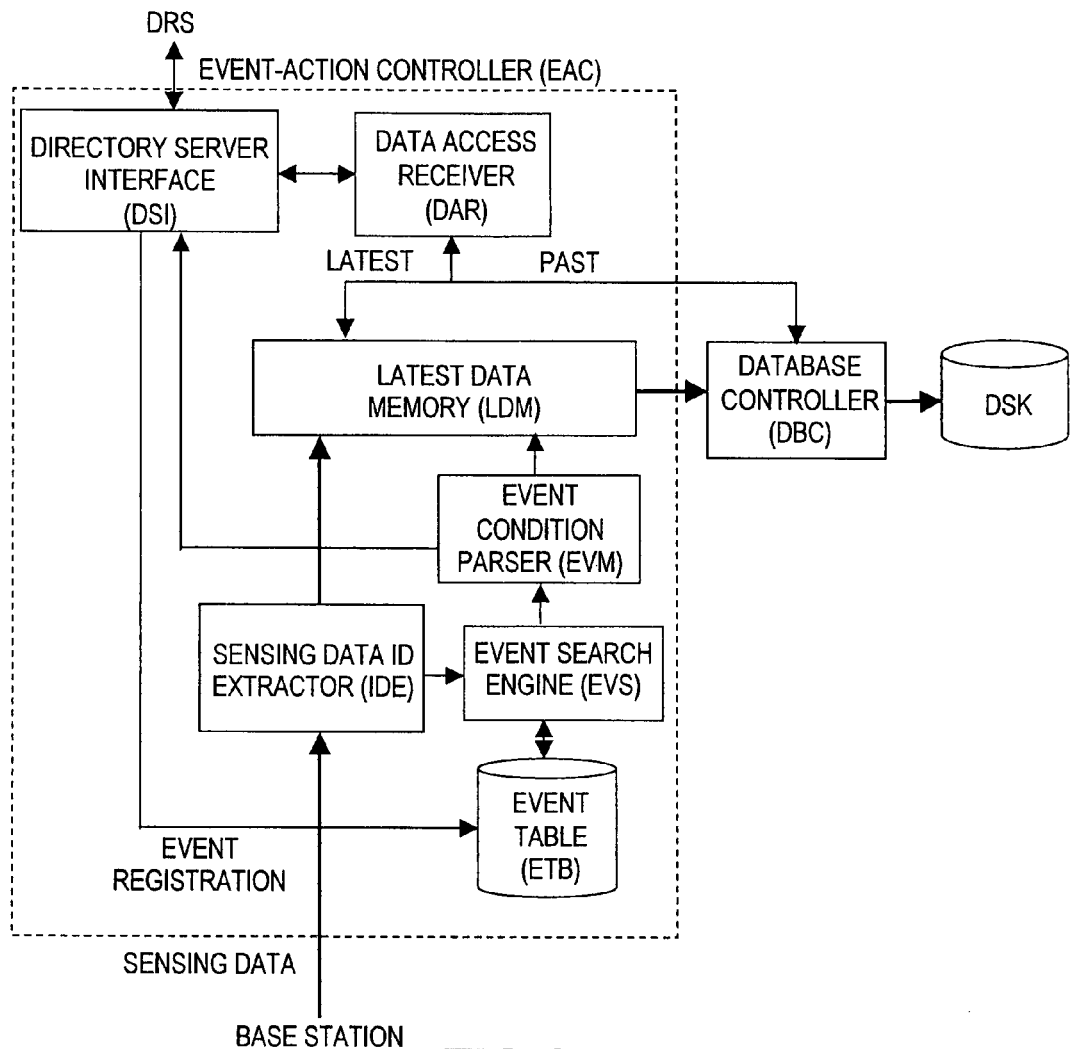
FIG. 9 is a block diagram showing the event-action controller of the distributed data processing server DDS.
FIG. 10 is a detailed description of the event table.

And now the relationship between measured data to be collected by the distributed data processing server DDS and the event/action based on the measured data will be shown in FIGS. 9 and 10.

In FIG. 9, the event-action controller EAC of the distributed data processing server DDS has an event table ETB for correlating the measured data collected by the base stations BST with events.

As FIG. 10 shows, a record of the event table ETB is made up of a data ID allocated to each sensor node and given to the measured data (corresponding to the data ID shown in FIGS. 12 and 14), EVT constituting the criteria of judging the occurrence of an event relating to the measured data, and a data holder DHL for determining whether the measured data should be stored in the database DB or not.

For example, in the figure, the measured data whose data ID is "XXX" notifies the directory server DRS on the occurrence of an event when its value is greater than A1. Incidentally, the measured data whose data ID is "XXX" are set in such a way that they will be written on the disk drive DSK whenever the data arrives.

The distributed data processing server DDS receives the measured data acquired from the base station BST at first by the sensing data ID extractor IDE and extracts the data ID or ID given to the measured data. And the sensing data ID extractor IDE sends the measured data to the latest data memory LDM.

The extracted data ID will be sent to the event search engine EVS to search the event table ETB, and when a record whose data ID matches is found, the event contents EVT of the record and the measured data will be sent to the event condition parser EVM.

The event condition parser EVM compares the value of the measured data and the event contents EVT, and when the conditions are satisfied, the event condition parser EVM notifies the directory server DRS that an event has occurred through the directory server interface DSI. And the event condition parser EVM transmits the request of the data holder DHL to the latest data memory.

Regarding the data which the data holder DHL of the event table ETB is ready to accept, the database controller DBC will receive the data from the latest data memory LDM and write the data on the disk drive DSK.

When the directory server interface DSI has received a reference request for the measured data from the directory server DRS, the distributed data processing server DDS will transmit the access request to the data access receiver DAR.

If the request for data access is for the latest data, the data access receiver DAR reads the measured data corresponding to the data ID contained in the access request from the latest data memory LDM, and returns the same to the directory server interface DSI. Or, if the access request is for the past data, the data access receiver DAR reads the measured data corresponding to the data ID contained in the access request from the disk drive DSK, and returns the same to the directory server interface DSI.

Thus, the distributed data processing server DDS retains the latest data in the latest data memory LDM from among the sensor node data collected from the base stations BST, and records other data in the disk drive DSK for reference in the future. And it is also possible to hold the data in the disk drive DSK only when an event has occurred to save the disc capacity. By this method, it will be possible to manage plural base stations BST (in other words a large number of sensor nodes) with a single distributed data processing server DDS.

<Details of the System Manager NMG and the Model Manager MMG>

<System Manager NMG>

Figure 11:
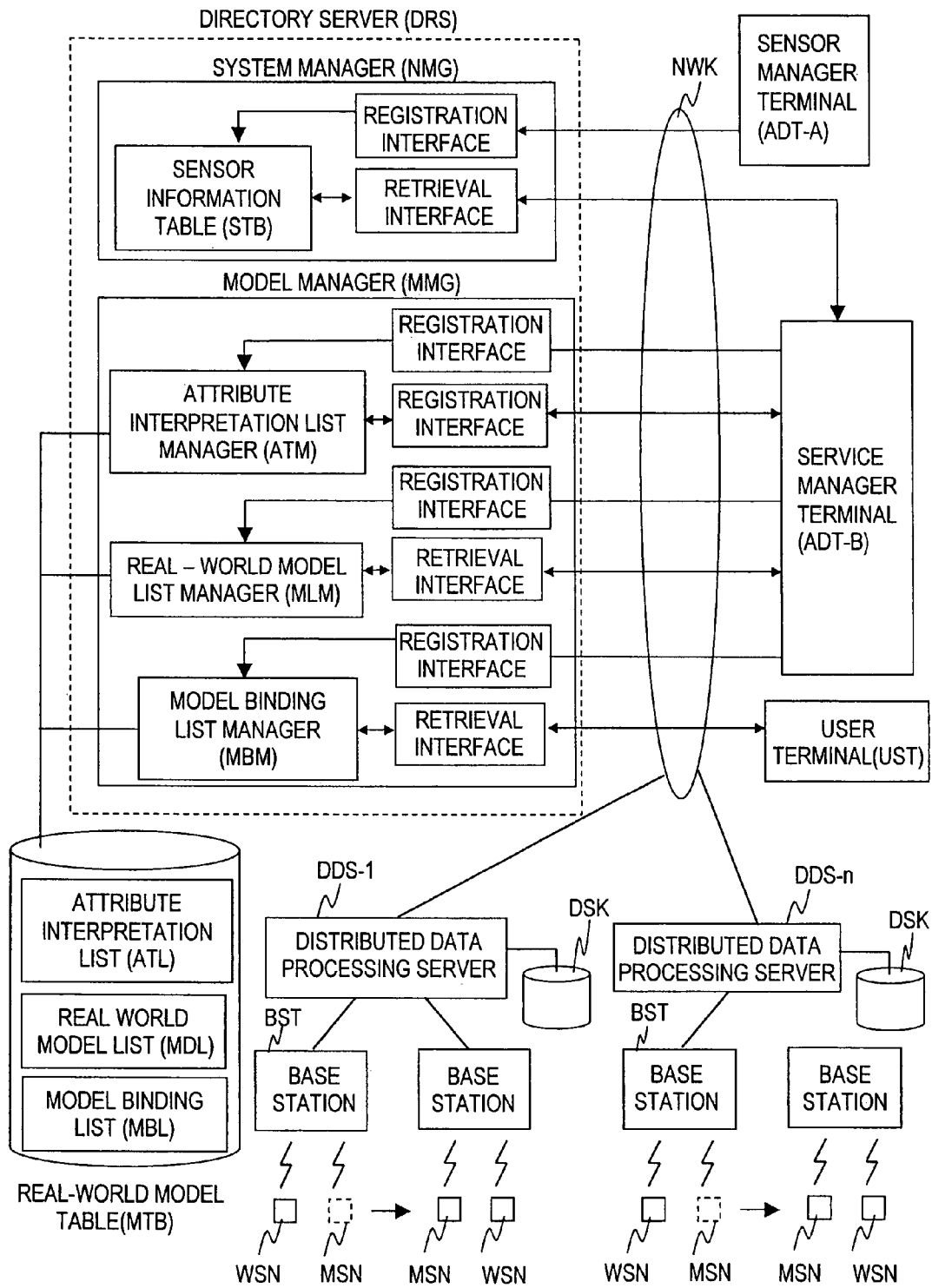
FIG. 11 is a block diagram showing the essential parts of the directory server DRS.

FIG. 11 shows the details of the system manager NMG and the model manager MMG of the directory server DRS and the real-world model table MTB shown in FIG. 2.

The system manager NMG of the directory server DRS includes a sensor information table STB for managing the sensor nodes, a registration interface for registering sensor nodes in the sensor information table STB, and a retrieval interface for retrieving the contents of the sensor information table STB. Incidentally, here the sensor information table STB will be managed by the sensor operation terminal ADT-A.

As FIG. 12 shows, the sensor information table STB is made up of a record of the data ID allocated in advance for each sensor node, the sensor type indicating the type of sensor node, the meaning indicating the object of measurement by the sensor node, the contents of measurement measured by the sensor node, the location indicating the position (or object) of the sensor node, the observation interval indicating the frequency by which the sensor node detects the measurement from the object of measurement, and the data link pointer showing the link pointer of the data measured (the position of storage in the distributed data processing server DDS-1 to DDS-n) which are managed by an ID for identifying the sensor node as an index.

For example, the table shows that the tag TG-1 of the wireless mobile sensor node MSN-1 constituted as an identification card shown in FIG. 5 is allocated a data ID of 01, and the object of measurement is the location (position) of the wireless mobile sensor node MSN-1, the frequency of measurement is every 30 seconds, and the measurement data is stored in the distributed data processing server DDS-1. Similarly, the table shows that the sensor SSR-1 disposed in the wireless mobile sensor node MSN-1 constituted as an identification card is allocated a data ID of 02, that the object of measurement is the ambient temperature, that the frequency of measurement is every 60 seconds, and that the measured data is stored in the distributed data processing server DDS-2.

This sensor information table STB contains data set by the sensor operation terminal ADT-A, and the sensor manager and the service manager can learn the functions and position of the sensor nodes and the link pointers of the measured data by referring the sensor information table STB.

When the frequency of measurement of data by the sensor node is not constant, like the seating sensor of the sensor node ID=03 shown in FIG. 12, only when the sensor has detected a specific state, this state will be notified to the distributed data processing server DDS irrespective of the frequency when the observation interval is set as "event."

<Model Manager MMG>

We will now describe the model manager MMG and the real-world model table MTB shown in FIG. 11.

The real-world model table MTB managed by the model manager MMG includes an attribute interpretation list ATL for interpreting what the measured data means, a real-world model list MDL showing the relationship of correspondence between the model name of the object OBJ-1 to OBJ-n shown in FIG. 6 and the actual information storage position and a model binding list MBL showing the relationship of correlation among the objects OBJ-1 to OBJ-n.

And the model manager MMG includes an attribute interpretation list manager ATM for managing the attribute interpretation list ATL, a real-world model list manager MDM for managing the real-world model list MDL, and a model binding list manager MBM for managing the model binding list MBL in order to manage each list of this real-world model table MTB, and each manager includes respectively a registration interface for registering/changing the list and a retrieval interface for retrieving each list.

It should be noted here that the real-world model table MTB should be managed by the service manager who uses the service operation terminal ADT-B. Furthermore, the sensor operation terminal and the service operation terminal shown in FIG. 11 may be integrated into a single operation terminal as shown in FIG. 1.

And the user terminal UST for using the sensor network will be used to retrieve objects OBJ from the desired list through the retrieval interface of each list.

In the first place, the attribute interpretation list ATL managed by the attribute interpretation list manager ATM includes a table for converting the output value of sensor nodes into meaningful information as shown in FIG. 13 because the return values (measurements) of the sensor nodes WSN, MSN and FSN and the secondary data converted by the distributed data processing servers DDS cannot be understood easily as they are by the users of the user terminals UST (hereinafter referred to simply as "user"). FIG. 13 is previously set according to the objects OBJ-1 to OBJ-n.

In FIG. 13, the name table ATL-m is related with the position of Mr. Suzuki OBJ-1 shown in FIG. 6, and as shown in FIG. 12, the personal name corresponding to the return value (measurement) from the identifier set in the tag TG set in the sensor node MSN-1 whose sensor type is identification card is indicated in the meaning column.

In FIG. 13, the place table ATL-p is a table showing the position of an employee wearing an identification card, and the name of place corresponding to the return value (e.g. the ID of the base station connected with the sensor node) is indicated in the meaning column. For example, a return value of 01 means that the place is an office.

The seat table ATL-s of FIG. 13 shows the state of persons sitting on the chairs in the office or in the meeting room A shown in FIG. 5, and stores the state of persons sitting (present or absent) corresponding to the return value (measurement) of wireless sensor nodes WSN-3 to WSN-10 installed on each chair (each wireless sensor node WSN-3 to WSN-10). For example, a return value of 00 shows that the person is present (seated), and a return value of 01 shows that the person is absent.

In the same way, the temperature table ATL-t of FIG. 13 is a table of values given by the temperature sensors (SSR-1, FSN-1 and 2 of MSN-1) shown in FIG. 5, and the function f (x) for converting the return value (the measured data of the temperature sensors) into temperature y will be stored in the meaning column.

In FIG. 13, the number of persons table ATL-n is a table showing the number of persons in the meeting room A, and the number of persons corresponding to the return value (the number of persons seated shown by the chair sensors in the meeting room A, or the number of mobile sensor nodes MSN in the meeting room A) will be indicated in the meaning column.

Thus, the attribute interpretation list ATL is a list defining the meaning corresponding to the measured data, and respective table will be created corresponding to the objects formed.

Figure 14:
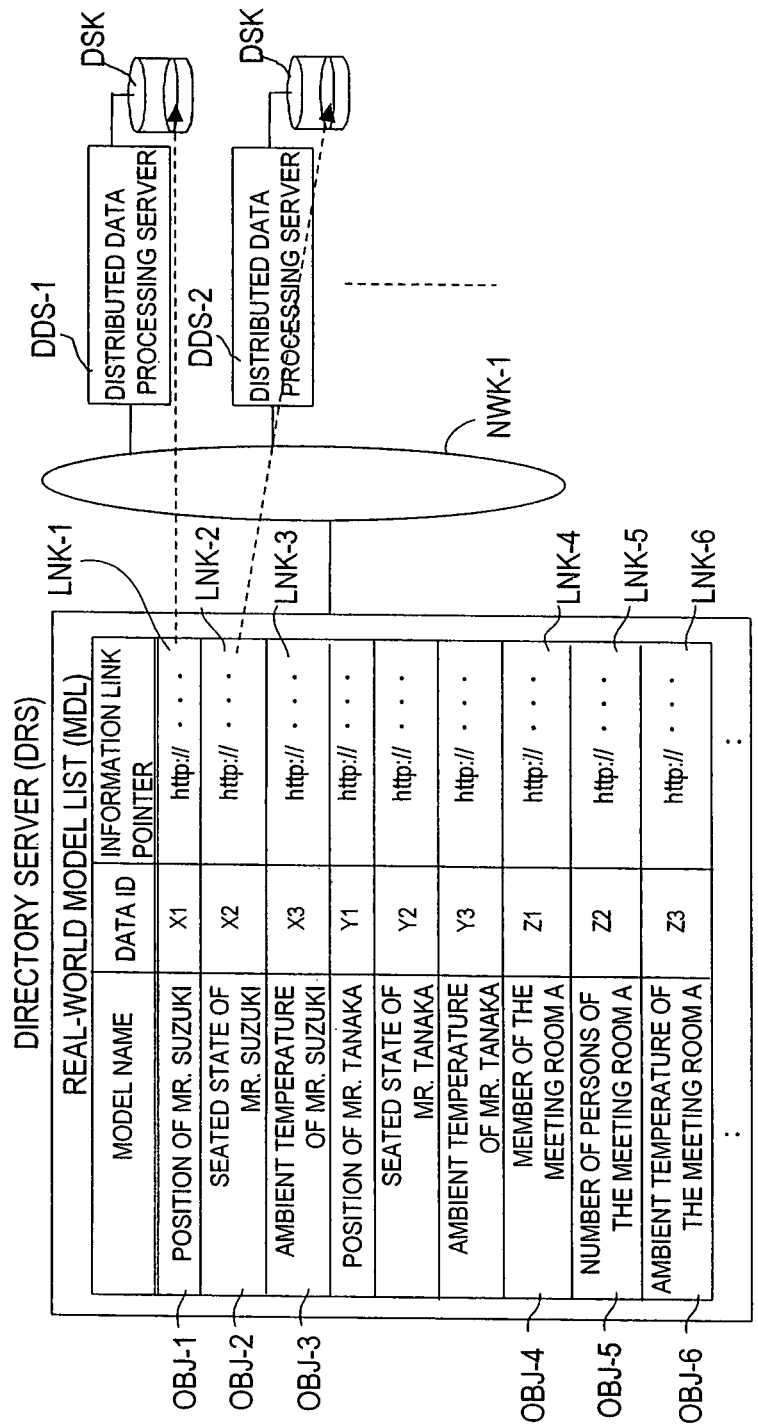
FIG. 14 is a block diagram showing the relationship between the real-world model list and the distributed data processing server DDS.

Then, the real-world model list MDL is a list created in advance by the service managers and the like, and as shown in FIG. 14 the position of information corresponding to the model name set for each object will be stored in the information link pointer. In other words, the combination of model name, information link pointer and data ID constitutes a real-world model list MDL.

The directory server DRS manages only meaningful information that the users can understand from the model list MDL, and this meaningful information will be located in any of the distributed data processing servers DDS-1 to DDS-n. As a result, the objects OBJ defined in the model list MDL indicate where the substance of the meaningful information is located in the information link pointer. Incidentally, this information link pointer is created in advance by the service manager and the like. In the same way, the data ID is a value corresponding to the sensor data (data acquired directly from the sensor node or secondary data acquired by processing) serving as the basis of the object value.

In FIG. 14, for example an information link pointer named LINK-1 for Mr. Suzuki's position OBJ-1 is stored, and this information link pointer stores URL, path and the like. When this object is retrieved from the user terminals UST, meaningful information (substance of the object) can be obtained from the information link pointers.

For example, when key word and the like are transmitted from the user terminals UST to the search engine SER of the directory server DRS, the list of model names including the key words from among the model names of the model list MDL will be returned from the search engine SER. When the user operating the user terminal UST has selected the desired model name, at first the directory server DRS acquires the data corresponding to the information link pointer from the distributed data processing server DDS created in the information link pointer LINK.

The directory server DRS converts the acquired data into information that the user can understand based on the attribute interpretation list ATL and transmits the same to the user terminals UST.

Therefore, users can acquire necessary information in the form of understandable information even if they have no knowledge on the individual sensor nodes nor of their location.

Since it is no longer necessary to convert the data collected from the sensor nodes into a form understandable for the users every time they are collected, in the distributed data processing server DDS, it is possible to drastically reduce the load of the distributed data processing servers DDS that collect and/or manage the data of a large number of sensor nodes. This conversion processing of data conducted by the directory server DRS if necessary at the request of users can eliminate any unnecessary conversion operation, and thus it will be possible to make the sensor network resources to function efficiently.

The model binding list MBL showing the relationship of correlation among the objects OBJ-1 to OBJ-n summarizes the related information on the elements common with the objects OBJ of the real-world model list MDL.

Figure 15:
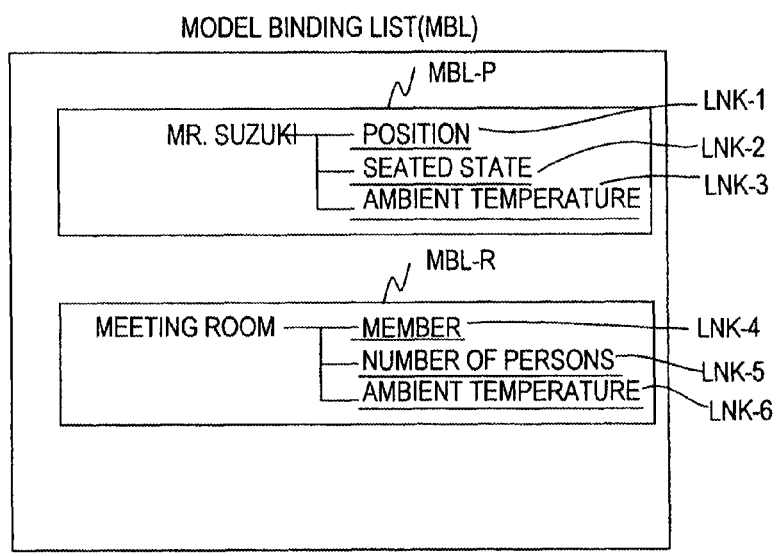
FIG. 15 is a detailed description of the model binding list.

As an example of the model binding list MBL, as FIG. 15 shows, "personal name" ("Mr. Suzuki" in the figure) and elements related with "the meeting room A" are extracted as common elements among the objects OBJ of the real-world model list MDL. For example, as objects OBJ related with the personal name of "Mr. Suzuki" registered in the meaning column of the name table ATL-m of the attribute interpretation list ATL shown in FIG. 13, there are position OBJ-1, seated state at the employee's own seat in the office OBJ-2, and temperature OBJ-3, and the link pointers of the objects related with the personal name of Mr. Suzuki are set in a tree structure as "position" LINK-1, "seated state" LINK-2, and "temperature" LINK-3 as shown in the figure, and this will constitute a model binding list MBL-P related to personal name.

In the same way, when the real-world model list MDL is viewed from the element of the meeting room A, there are objects OBJ-4 to OBJ-6 of "members," "number of employees" and "temperature." The information link pointers LINK-4 to LINK-6 of the objects related with the place of the meeting room A are set in a tree structure as "members," "number of employees" and "temperature." Thus, the model binding list MBL-R related with the meeting room A will be constituted.

Thus, the model binding list MBL will constitute a source of information relating different pieces of information having common elements out of the elements of the objects of the real-world model list MDL. It should be noted that different elements of this model binding list MBL were related in advance by the service manager and the like.

<Operation of the Model Manager MMG>

We will describe the operation of the sensor network system as follows.

<Registration of the Sensor Nodes>

Figure 16:
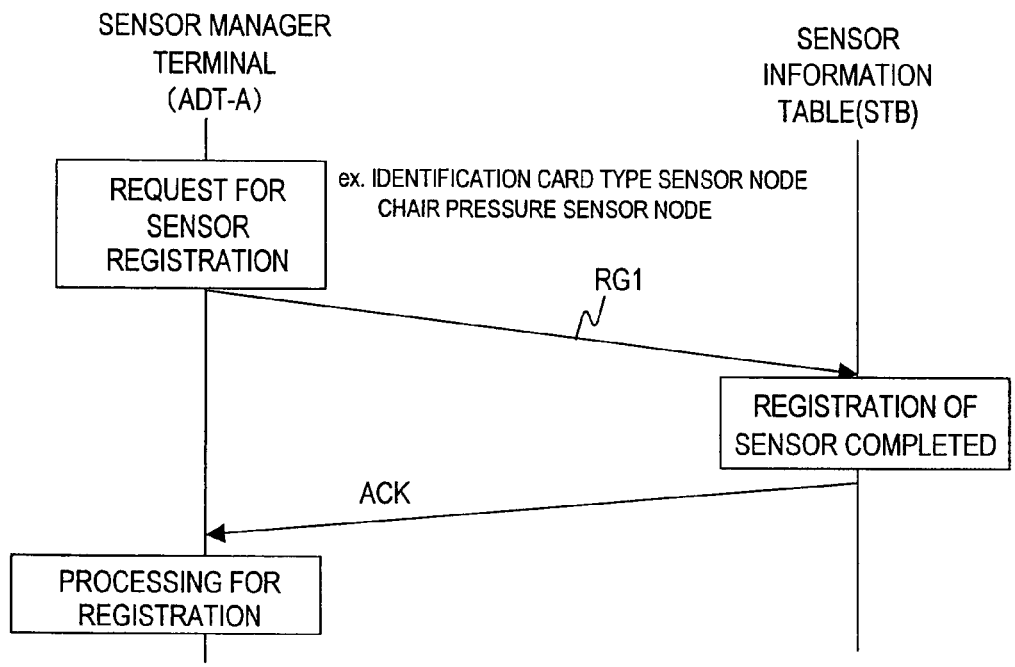
FIG. 16 is a time chart showing the steps of registering the sensor information.
Figure 17:
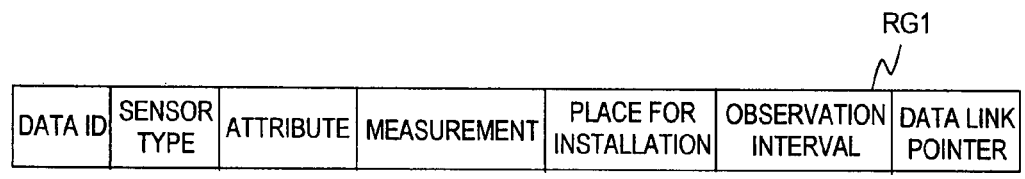
FIG. 17 is a data format for registering sensor nodes.

To begin with, we will describe the procedure of registering sensor nodes with reference to FIGS. 16 and 17. The sensor manager installs a sensor node at a predetermined place or on an employee and then registers the sensor node on the directory server DRS according to the time chart shown in FIG. 16.

In FIG. 16, the sensor manager accesses the directory server DRS through the sensor operation terminal ADT-A, and accesses the registration interface of the system manager NMG. Then, the sensor manager sets the data ID, the sensor type, attribute, measurement values, place of installation, interval of observation, and the data link pointer from the sensor operation terminal ADT-A using the data format shown in FIG. 17, and transmits the same to the system manager NMG of the directory server DRS as a request for registration (RG-1). Here, before proceeding to registration, the data link pointers should be secured and the attribute should be designated to the distributed data processing server DDS that is supposed to receive the sensor node data.

Upon receipt of this request for registration, the system manager NMG of the directory server DRS adds the sensor node information for which the request for registration was presented to the sensor information table STB shown in FIG. 12. And the system manager NMG allocates an identifier ID to the newly added sensor node. This sensor node ID may be allocated from the sensor operation terminal ADT-A.

The system manager NMG allocates the link pointer of the measured data of the sensor node for which a request for registration was presented to the distributed data processing server DDS designated as a data link pointer and then completes a record of the sensor information table STB.

Finally, the system manager NMG returns a notice of completion (ACK) to the sensor operation terminal ADT-A, indicating that a new record was successfully added.

Incidentally, although not shown in any figure, upon receipt of a notice of registration of a sensor node from the directory server DRS, the distributed data processing server DDS issues a command to the base station BST corresponding to "the place of installation" in FIG. 17 to enable the sensor node having the relevant ID with predetermined observation frequency. The sensor manager SNM of the base station BST will receive the registration of the data ID and the observation interval.

In this way, the new sensor node will be able to transmit the measured data to the distributed data processing server DDS to which this sensor node belongs through the base station BST.

<Definition of Objects>

Figure 18:
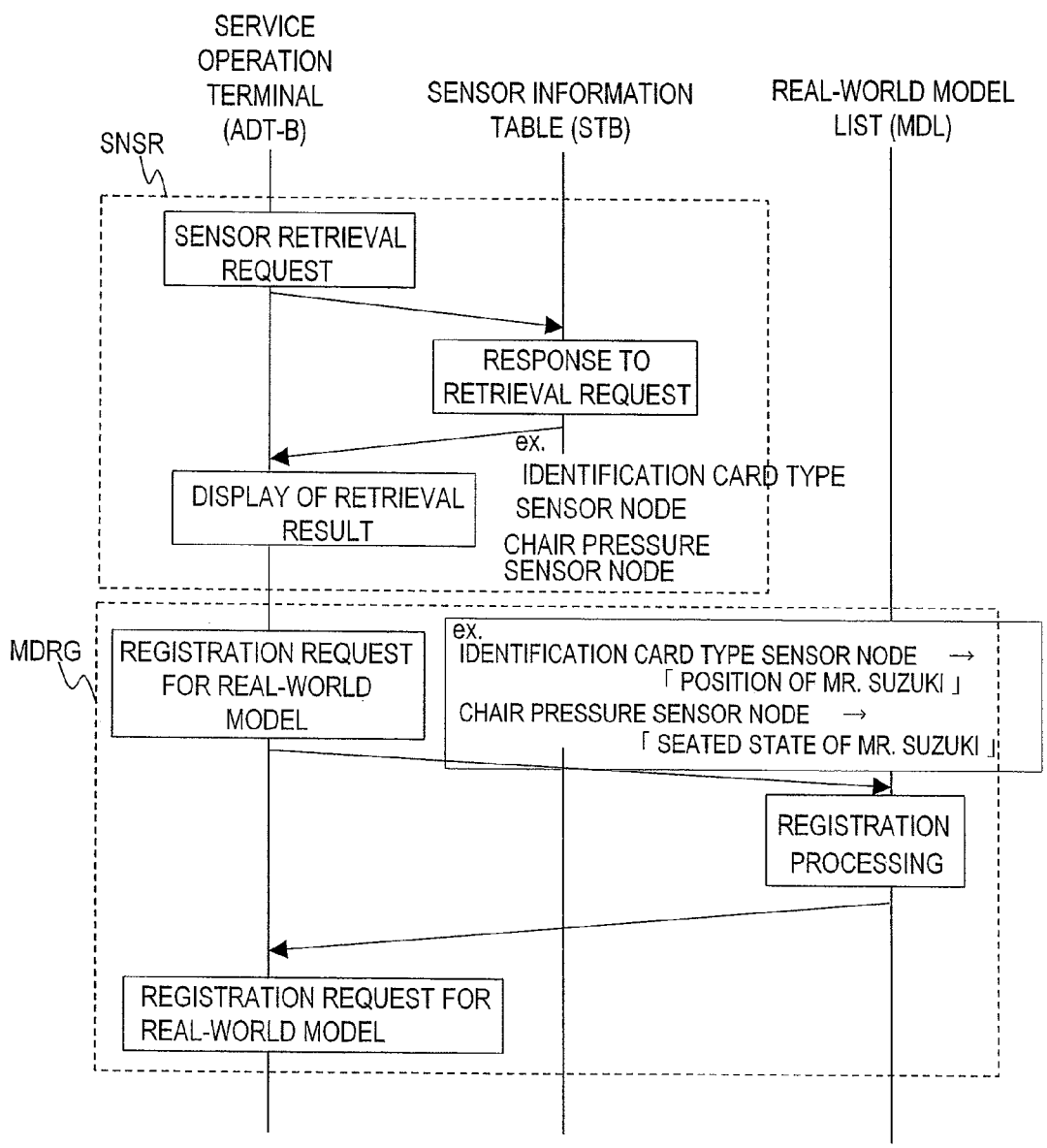
FIG. 18 is a time chart showing the steps of registering the real-world model list.

Then, we will describe the operation of creating the relationship between the measured data of the sensor node and the objects concerning the sensor node registered on the directory server DRS in FIGS. 16 and 17 above with reference to FIG. 18. It should also be noted that this operation is to be carried out by the service manager of the sensor network.

In FIG. 18, the service manager accesses the directory server DRS from the service operation terminal ADT-B to access the retrieval interface of the system manager NMG. Then, the service manager retrieves the desired sensor nodes based on the ID and the like and returns the sensor nodes meeting the retrieval conditions to the service operation terminal ADT-B.

The service operation terminal ADT-B shows the retrieval result of the sensor nodes that have been received from the system manager NMG on the display devices and the like.

The service manager selects a desired sensor node from the sensor nodes displayed on the service operation terminal ADT-B, designates the objects to be correlated with the measured data of this sensor node, and registers the same on the model manager MMG of the directory server DRS.

For example, the service manager registers the object OBJ-1 of "Mr. Suzuki's position" as the object of the identification card-type sensor node (MSN-1 of FIG. 5) of ID=01 of the sensor information table STB shown in FIG. 12. This registration results in the creation of a real-world model list (MDL) showing the relations between the object and its information link (FIG. 14).

The model manager MMG issues a predetermined command to the distributed data processing server DDS-1 to, for example, store the position of the base station BST having received the mobile sensor node MSN with a tag ID TG-1 (Mr. Suzuki's identifier) with regards to the object OBJ-1 of "Mr. Suzuki's position" in the distributed data processing server DDS-1.

The distributed data processing server DDS-1 is set to register an action in the event-action controller EAC. The content of the action is set to store the position of the base station BST in the database DB on receipt of TG-1 data whose tag ID indicates Mr. Suzuki.

An information link pointer corresponding to the object OBJ-1 of the real-world model list MDL will be set regarding the substance of the data "Mr. Suzuki's position" stored in the database DB of the distributed data processing server DDS-1.

Or, with regards to the object OBJ-2 of "Mr. Suzuki's seating" the model manager MMG issues a command to the distributed data processing server DDS-1 to write a value of "00" in the database DB of the distributed data processing server DDS-1 if the measurement of the wireless sensor node WSN-0 with a pressure switch as a sensor SSR is ON, and to write a value of "01" in the database DB of the distributed data processing server DDS-1 if the measurement of the wireless sensor node WSN-0 is OFF.

Upon receipt of this command, the event action controller EAC of the distributed data processing server DDS-1 proceeds to an operation of writing "00" or "01" for the measured data of the sensor node WSN-0 (corresponding respectively ON or OFF) in the database DB of the distributed data processing server DDS-1.

In the same way as described above, an information link pointer corresponding to the object OBJ-2 of the real-world model list MDL will be set regarding the substance of the data "Mr. Suzuki's seating" stored in the database DB of the distributed data processing server DDS-1.

In this way, the object (information link pointer) set by the model manager MMG and the position of the distributed data processing server DDS for actually storing the information are set.

As FIG. 14 shows, the model manager MMG creates the object OBJ-1 of "Mr. Suzuki's position" and stores the model name, the data ID and the information link pointer in the real-world model list MDL. When the registration of the object is completed, the model manager MMG sends a notice of completion to the service operation terminal ADT-B.

For displaying the notice of completing the creation of the objects received and for creating the object, the service operation terminal ADT-B repeats the operation described above to create the desired objects.

<Definition of the Model Binding List>

Figure 19:
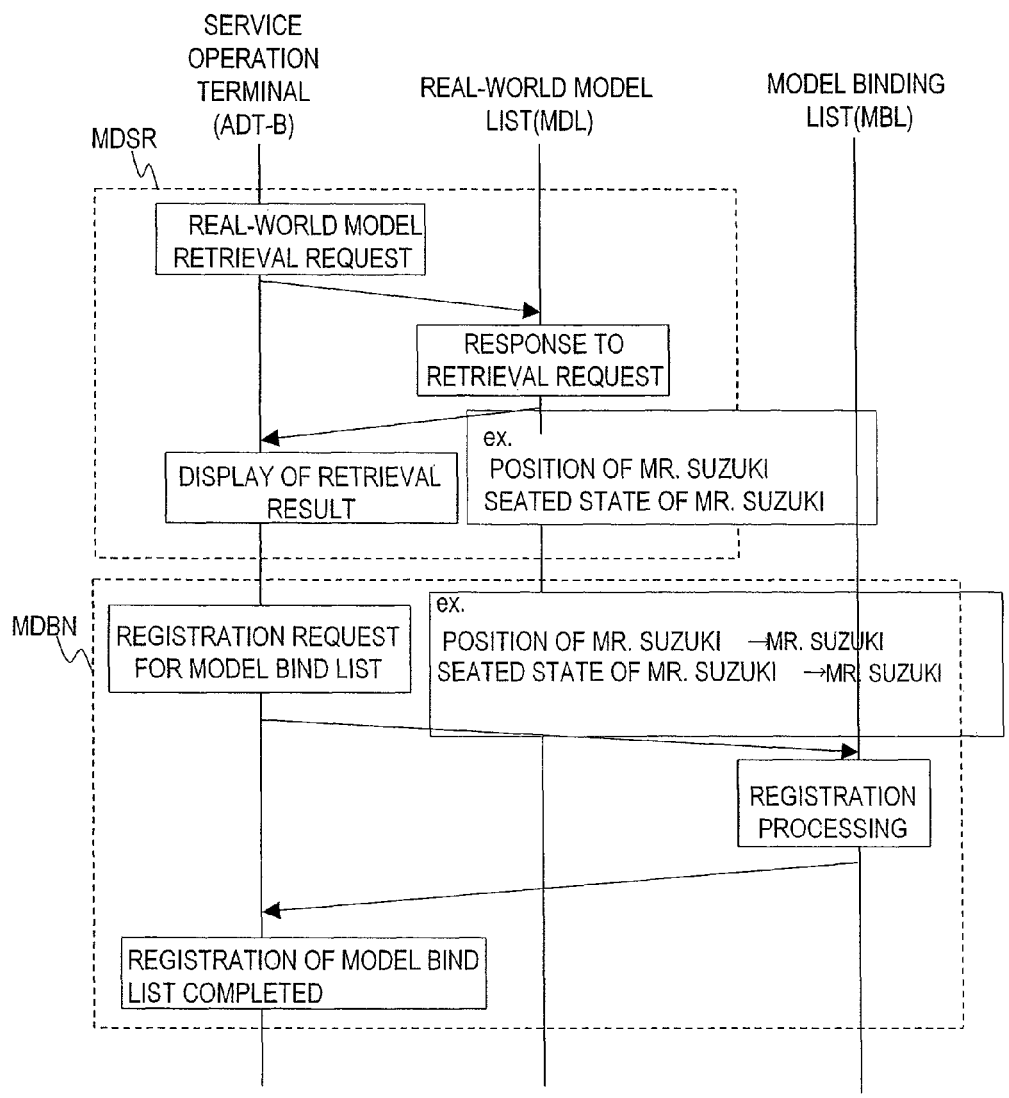
FIG. 19 is a time chart showing the steps of registering the model binding list.

Then, after the creation of plural objects by the definition of the model list MDL described above, we will describe the process of setting the model binding list MBL showing the relationship of correspondence among plural objects OBJ-1 to OBJ-n with reference to FIG. 19.

In FIG. 19, the service manager accesses the model manager MMG of the directory server DRS from the service operation terminal ADT-B to access the retrieval interface of the model manager MMG. Then, the service manager retrieves the desired objects and returns the object matching the retrieval conditions to the service operation terminal ADT-B.

The service operation terminal ADT-B outputs the retrieval result of the objects received from the model manager MMG on a display device not shown and the like.

The service manager selects a desired object from among the objects displayed in the service operation terminal ADT-B and requests the model manager MMG of the directory server DRS to indicate the elements common to all the objects in a model binding list.

For example, as FIG. 15 shows, the personal name "Mr. Suzuki" will be created in the model binding list MBL-P, and this model binding list MBL-P will be related with the position of Mr. Suzuki OBJ-1, the seating state of Mr. Suzuki OBJ-2, and the temperature of Mr. Suzuki OBJ-3.

The model manager MMG relates the model binding list MBL-P with the information link pointer of all the objects OBJ-1 to OBJ-3 and stores the same in the model binding list MBL.

When the registration of the model binding list MBL is completed, the model manager MMG sends a notice of completion to the service operation terminal ADT-B.

For displaying the notice of completing the creation of the model binding list received and for creating the model binding list, the service operation terminal ADT-B repeats the operation described above to create the desired model binding list.

<Retrieval of the Model Binding List>

Figure 20:
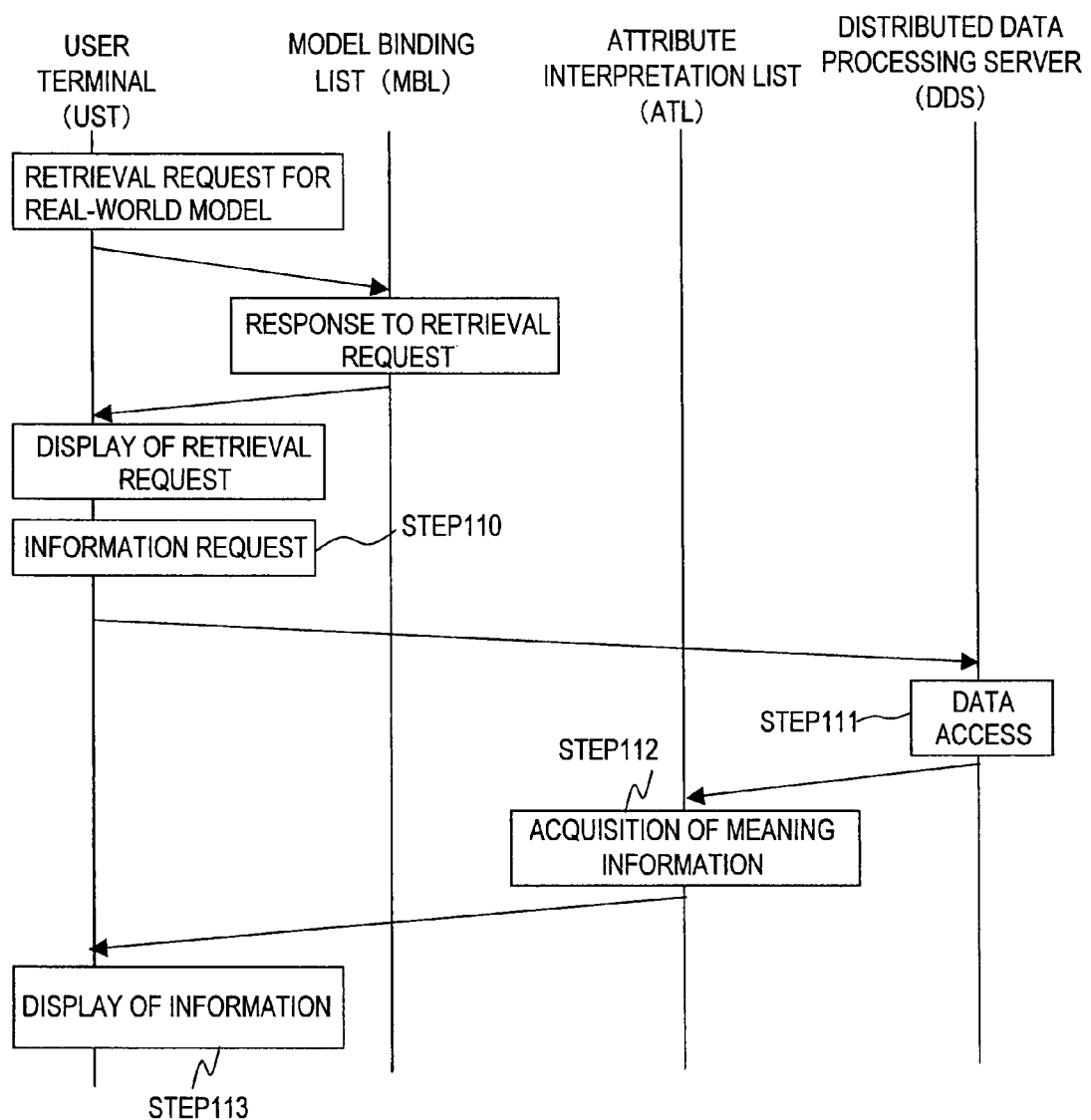
FIG. 20 is a time chart showing an example of responses to the access to the model binding list.
Figure 21:
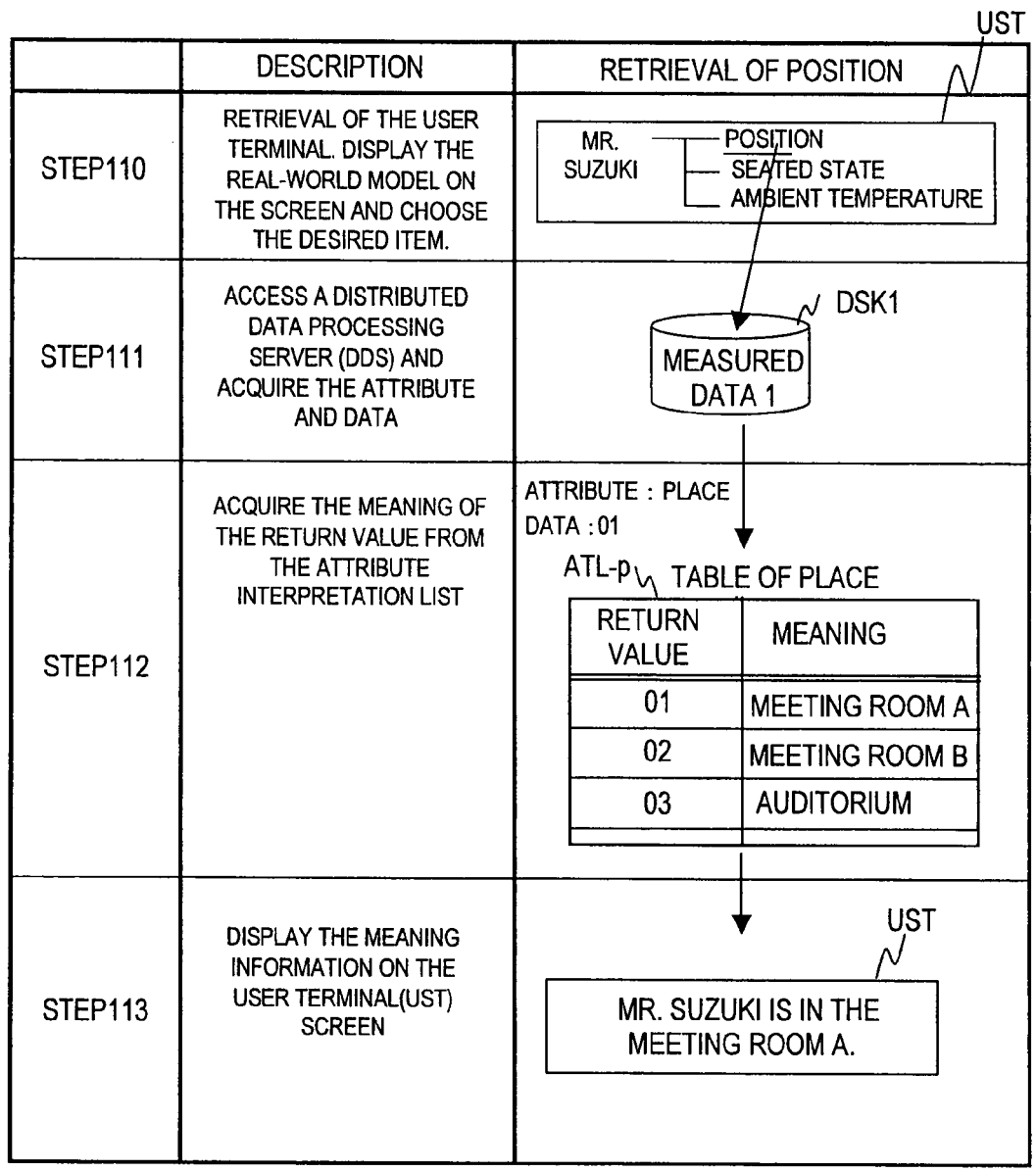
FIG. 21 is a detailed description of the steps required when the position of Mr. Suzuki is designated from the model binding list.

We will then describe an example of the process of a user of the sensor network referring the data of the sensor node using the model binding list MBL with reference to FIGS. 20 and 21.

The user terminal UST accesses the search engine SER of the directory server DRS, and requests the model binding manager MBM to retrieve the model binding list MBL. This request for retrieval is made, for example, by the retrieval of key words and GUI as shown in FIG. 15.

The model binding list manager MBM returns the result of retrieval requested to the user terminal UST and displays the result of the model binding list matching with the retrieval request on a display device of the user terminal UST.

The user selects any model binding list from among the retrieval result on the user terminal UST and requests information (Step 110).

Here, as FIG. 15 shows, the model binding list is constituted by link points in a tree structure grouped together by common elements among the objects OBJ, and the users present their request for information to the distributed data processing server DDS constituting the link pointer by choosing any link pointer displayed in the model binding list of the user terminal UST.

In the distributed data processing server DDS, the user accesses the measured data or secondary data requested from the user terminals UST and returns the access result to the attribute interpretation list manager ATM of the directory server DRS.

In the directory server DRS, the attribute interpretation list manager ATM obtains the meaning for the return value of the attribute interpretation list ATL shown in FIG. 13 from the ID of the measured data sent from the distributed data processing server DDS (Step 112).

Then, the search engine SER of the directory server DRS returns the meaning corresponding to the measured data analyzed by the attribute interpretation list manager ATM to the user terminal UST, and the user terminal UST displays the response of the directory server DRS in the place of the response from the distributed data processing server DDS.

For example, when the link pointer LINK-1 of the model binding list MBL-P shown in FIG. 15 is chosen, the measured data of the distributed data processing server DDS-1 set previously for the position of Mr. Suzuki OBJ-1 from the user terminal UST is accessed. If the link pointer LINK-1 is related for example with the data link pointer of the sensor information table STB shown in FIG. 12, the distributed data processing server DDS reads the measured data of the mobile sensor node MSN-1 being the measured data from the database DB corresponding to this data link pointer, and returns to the directory server DRS.

In the directory server DRS, the place table ATL-p of the attribute interpretation list ATL is chosen from data attribute stored together with data, and the meaning corresponding to the return value (measurement) is acquired. In this case, if the return value is 02 for example, the information of the link pointer LINK-1 of the model binding list MBL-P will be "meeting room A." Therefore, the response for the object OBJ-1 of "Mr. Suzuki's position" of the model binding list MBL-P is converted from a measurement value of the sensor node MSN-1 "02" into the meaningful information "meeting room A" and will be displayed (or notified) on the user terminal UST. Incidentally, the present embodiment shows the method wherein the data attribute will be acquired together with the data. In this case, the data link pointer and their attribute of sensor node are set, at the time of registration, to the distributed data processing server DDS that is to receive data from the sensor node. As another method of acquiring data attribute, attributes may be designated to models at the time of registering the real-world model list MDL.

Figure 22:
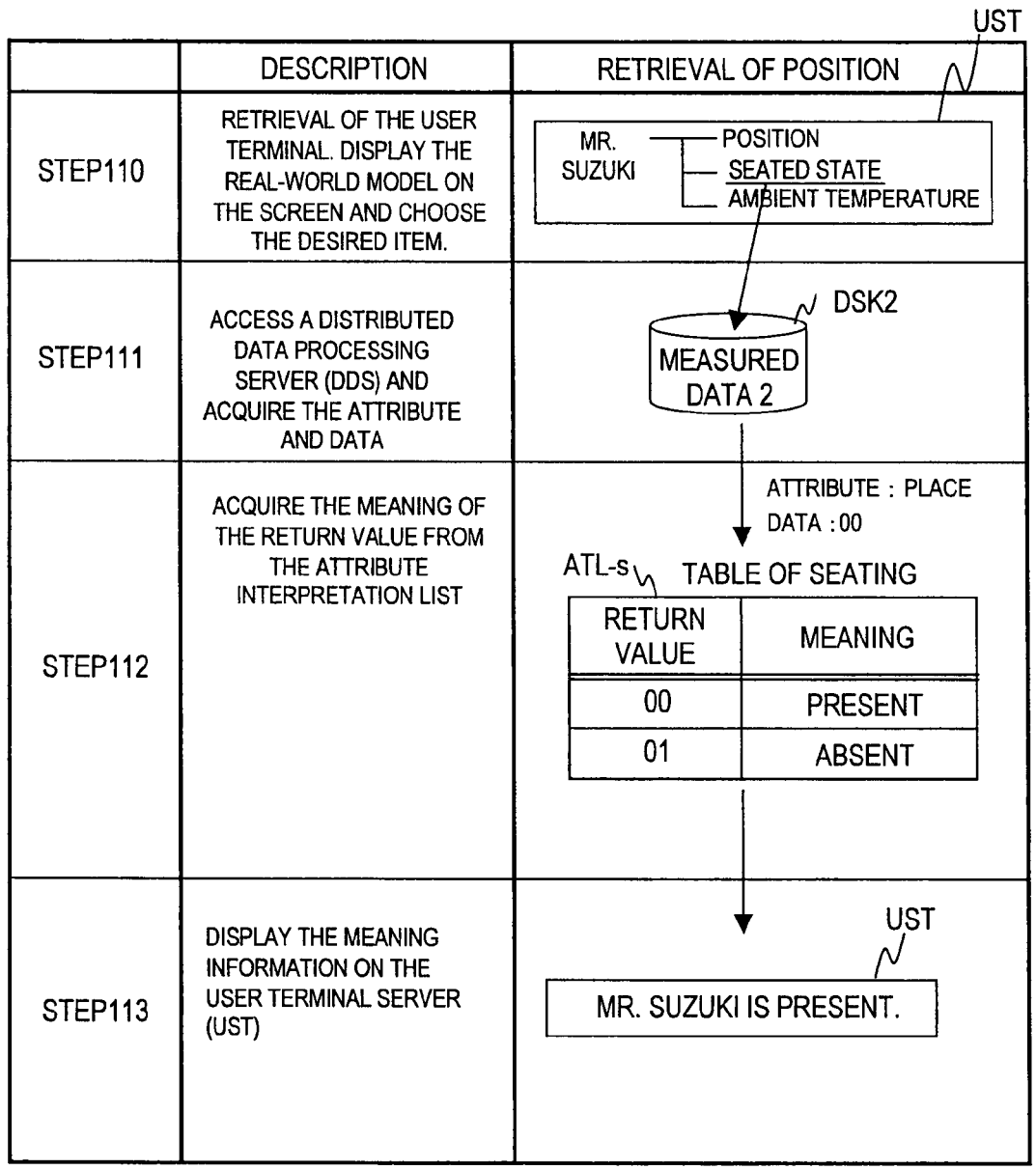
FIG. 22 is a detailed description of the steps required when the seated state of Mr. Suzuki is designated from the model binding list.

FIG. 22 shows the case of carrying out the operation of FIG. 20 above for "the seating state of Mr. Suzuki" LINK-2 of the model binding list MBL-P shown in FIG. 15. In this case also, the return value "00" from each wireless sensor node WSN-3 to WSN-10 is read from the distributed data processing server DDS, and in the attribute interpretation list manager ATM of the directory server DRS, the return value="00" will be "present" and a meaningful information that "Mr. Suzuki is present" can be returned from the search engine SER to the user terminal UST.

Figure 23:
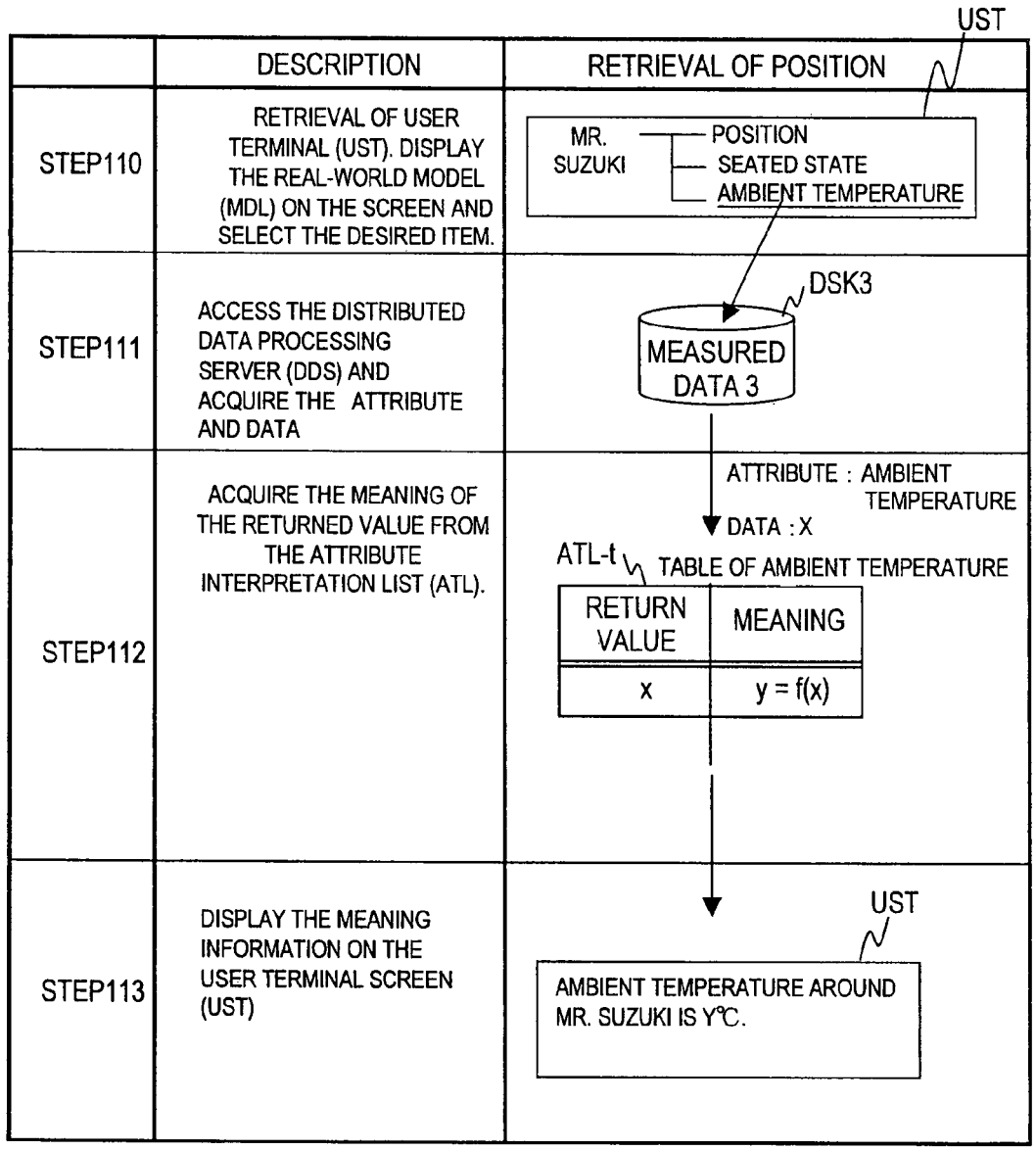
FIG. 23 is a detailed description of the steps required when the temperature of Mr. Suzuki is designated from model binding list.

FIG. 23 shows the case of carrying out the operation of FIG. 20 above for "the temperature of Mr. Suzuki" LINK-3 of the model binding list MBL-P shown in FIG. 15. In this case also, a return value "x" from the sensor SSR-1 of each wireless sensor node MSN-1 is read from the distributed data processing server DDS, and a return value=x is calculated as temperature y=f(x) in the attribute interpretation list manager ATM of the directory server DRS, and a meaningful piece of information that "the ambient temperature around Mr. Suzuki is y ° C." can be returned from the search engine SER to the user terminal UST.

Figure 24:
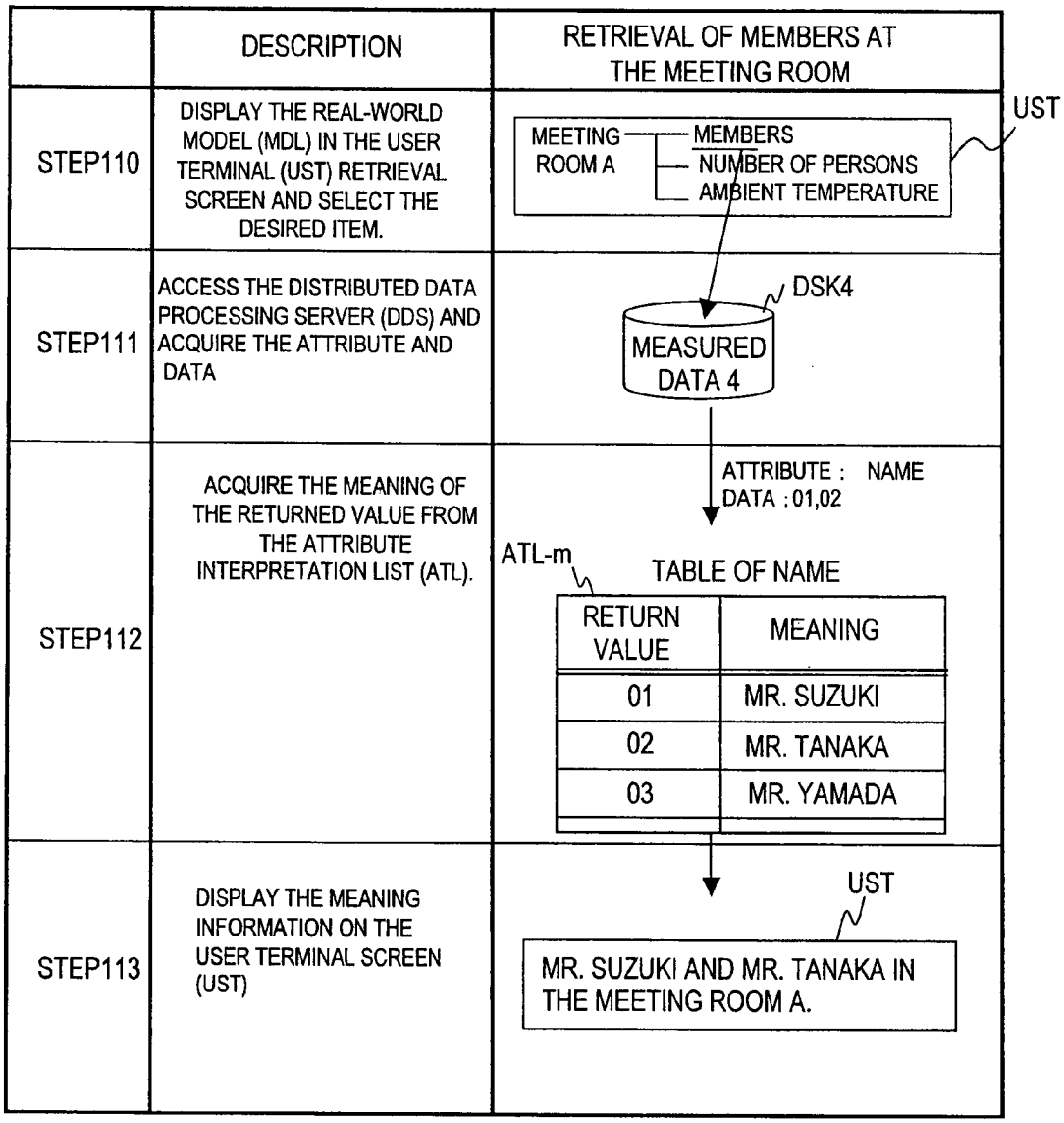
FIG. 24 is a detailed description of the steps required when the members of the meeting room A are designated from the model binding list.

FIG. 24 shows the case of carrying out the operation of FIG. 20 above for "the members in the meeting room A" of the model binding list MBL-R shown in FIG. 15. In this case, when an object formed of the members of the meeting room A OBJ-4 is created in the model manager MMG, in the predetermined distributed data processing server DDS-1, the tag ID of the identification card node detected by the base station BST-1 corresponding to the meeting room A is read in the base station BST-1 as measured data. And this value will be stored in the information link pointer shown in FIG. 14 (here, the distributed data processing server DDS-1) set in advance as a data link pointer.

The distributed data processing server DDS-1 collects at a prescribed frequency the tag ID of the wireless sensor nodes MSN-1 to MSN-n from the base station BST-1 and updates the value showing the members of the meeting room A (set of tag ID of the identification card nodes). FIG. 24 shows that the employees whose tag ID are "01" and "02" have been detected in the meeting room A from the wireless mobile sensor nodes MSN-1 to MSN-n collected by the distributed data processing server DDS-1.

The distributed data processing server DDS-1 transmits this secondary data "01. 02" to the attribute interpretation list manager ATM of the directory server DRS.

The attribute interpretation list manager ATM of the directory server DRS converts the secondary data received into meaningful information of 01=Suzuki and 02=Tanaka with reference to the personal name table ATL-m defined in advance and send the same to the user terminal UST.

As a result, on the user terminal UST, meaningful information that "Mr. Suzuki and Mr. Tanaka are in the meeting room A" can be obtained in response to the request for information on the members in the meeting room A of the model binding list MBL-P.

FIG. 25 shows the case of carrying out the operation shown in FIG. 20 above for "the number of persons in the meeting room A" of the model binding list MBL-R shown in FIG. 15. In this case, when an object formed of the number of persons in the meeting room A OBJ-5 is created in the model manager MMG, in the predetermined distributed data processing server DDS-1, the number of persons in the meeting room A, specifically the number of IDs of the identification card detected by the base station BST-1 corresponding to the meeting room A or the number of the seating detection nodes which is ON is calculated. And this value will be stored in the information link pointer shown in FIG. 14 set in advance as a data link pointer of the object OBJ-5.

The distributed data processing server DDS-1 collects the number x of the IDs of the wireless mobile sensor nodes MSN-1 to MSN-n from the base station BST-1 at a prescribed frequency, and calculates and updates the value showing the number of persons at the meeting room A (secondary data). The distributed data processing server DDS-1 sends this secondary data x to the attribute interpretation list manager ATM of the directory server DRS.

The attribute interpretation list manager ATM of the directory server DRS converts the received secondary data into meaningful information of a number of person y=x from the number of person table ATL-n defined in advance and send the same to the user terminal UST from the search engine SER.

As a result, it is possible to acquire a meaningful piece of information that "there are y persons in the meeting room A" in response to a request for information for the number of persons in the meeting room A of the model binding list MBL-P at the user terminal UST.

<Action Controller>

Figure 26:
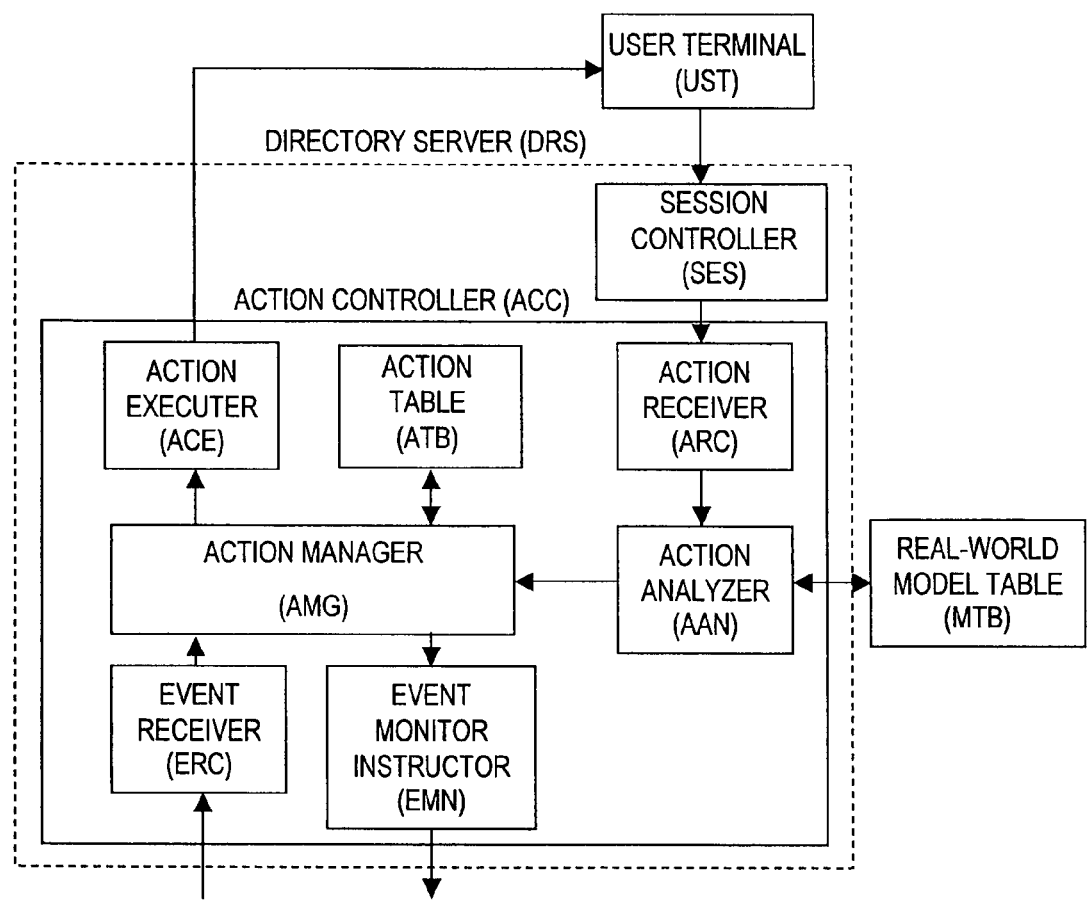
FIG. 26 is a block diagram of the action controller ACC of the directory server DRS.

FIG. 26 is a block diagram showing the details of the action controller ACC of the directory server DRS.

Based on a notice on the occurrence of an event received from the event action controller EAC of plural distributed data processing servers DDS, the action controller ACC automatically performs an "action" previously set.

Accordingly, the action controller ACC includes an action receiver ARC for receiving the setting of action from the user terminal UST through the session controller SES, an action analyzer AAN for analyzing the action received and for setting the distribution of functions (or loads) between the directory server DRS and the distributed data processing server DDS according to the analysis result, an action manager AMG for managing the definition and execution of actions, an action table ATB for storing the relationship between the events and actions according to the request for setting from the user terminal UST, an event monitor instructor EMN for issuing instructions to the distributed data processing server DDS-1 to DDS-n to monitor the events defined in the action table ATB, an event receiver ERC for receiving the notice of events that occurred at each distributed data processing server DDS-1 to DDS-n, and an action executer (executing unit) ACE for executing the prescribed actions based on the definition of the event-action table ATB received.

Figure 27:
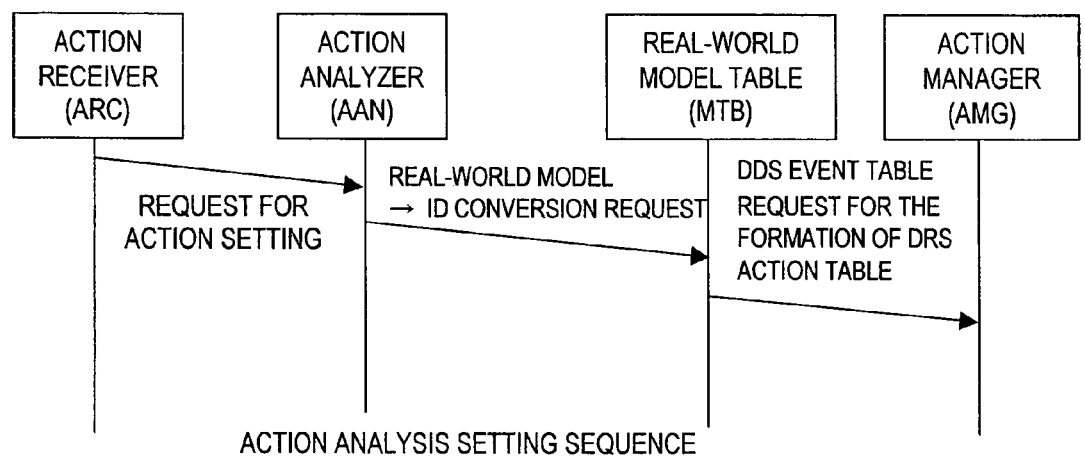
FIG. 27 is a timing chart showing the steps of registering an action table.

The registration of actions is explained with reference to the timing chart in FIG. 27. In FIG. 27, in the beginning, the user (or the service manager) accesses the action controller ACC of the directory server DRS through the user terminal UST or the like to request the setting of action. For example, as an example of action shown in FIG. 28, we will examine the case where Mr. X taking his seat triggers sending a pop-up notice to the IP address of the user terminal UST of A.

Upon receipt of this request for action setting, the action receiver ARC of the action controller ACC requests to the action analyzer AAN to set the action. The action analyzer AAN selects the data ID of the object of monitoring, for example, from Mr. X taking his seat, and decides which condition of the measured data of the sensor nodes to be met to trigger an action. Here, in order to convert the real-world event of "Mr. X taking his seat" into a data ID, the model of "Mr. X taking his seat" will be retrieved by referring the real-world model list MDL of the real-world model table MTB and the attribute interpretation list ATL.

Since, in FIG. 29, the model is already defined in the real-world model table MTB, the data ID=X2 and the information link pointer (the distributed data processing server DDS1) for storing the data will be acquired from the lists MDL and ATL mentioned above.

Then, the action manager AMG sends an instruction to the distributed data processing server DDS which manages the sensor node in order to monitor the occurrence of an event of "Mr. X taking seat". And the action manager AMG sets an action of "IP address: send a pop-up notice to the user terminal UST of A" in the action table ATB, and sets the sensor node ID mentioned above as an ID of the event of executing the action.

Figure 30:
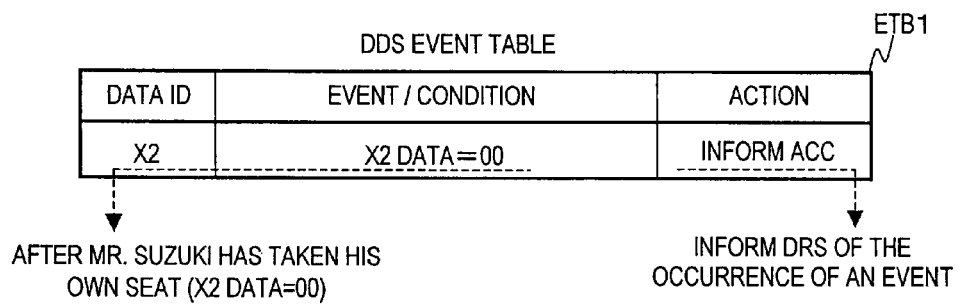
FIG. 30 is a detailed description showing entries in the event table of the distributed data processing server DDS.

Upon receipt of the instruction of the action manager AMG of the directory server DRS, as shown in FIG. 30, with regards to the data ID=X2 acquired from the real-world model list MDL, the distributed data processing server DDS registers the condition "00" for taking seat acquired from the attribute interpretation list ATL and the action controller ACC of the directory server DRS registers as the recipient of the notice of an event to be undertaken for an action. Incidentally, the notice to be given to the directory server DRS is an action executed in the distributed data processing server DDS-1.

In other words, in the event table ETB shown in FIG. 30 the sensor node ID=X2 with a pressure sensor showing "Mr. Suzuki seated" will be set in the data ID column showing the ID of the measured data, "00" indicating the seating state will be set in the event condition column, and the action of notifying to the action controller ACC of the directory server DRS will be set in the action column of the distributed data processing server DDS-1.

Figure 31:
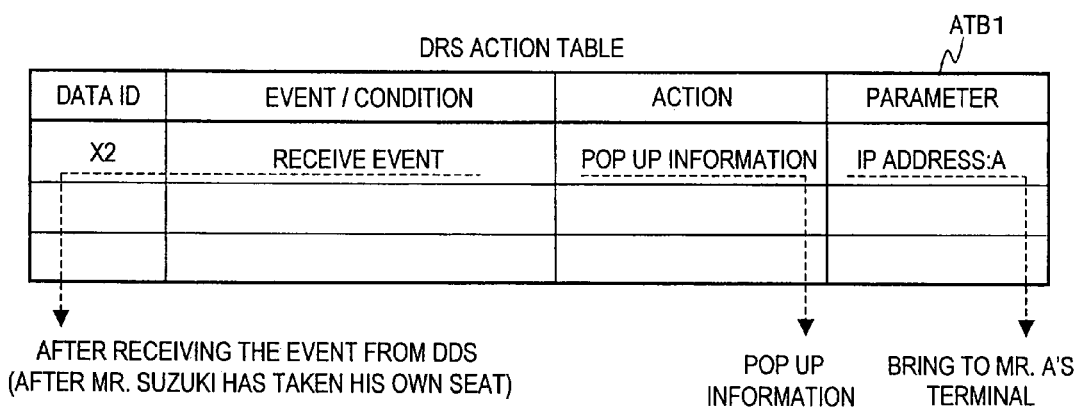
FIG. 31 is a detailed description showing entries in the action table of the directory server DRS.

As is shown in the action table ATB shown in FIG. 31, the sensor node ID=X2 indicating that "Mr. Suzuki is seated" will be set in the data ID column showing the event ID of the object of monitoring, the reception of the occurrence of an event from the distributed data processing server DDS-1 will be set in the event condition column, a pop-up notice to the user terminal UST will be set in the action column to be executed by the directory server DRS, and the IP address indicating Mr. A from among the user terminal UST will be set in the action parameters column.

The action to be registered by the action manager AMG in the action table ATB will be, as shown in FIG. 31, conditioned by the reception of the event of data ID=X2, and the action of a pop-up notice will be set to be sent to the address (here the terminal of the IP address) entered in the parameter column.

On the other hand, the screen for requesting the action setting in FIGS. 28 and 29 is provided by the action receiver ARC of the directory server DRS to the user terminal UST, and the real-world model list MDL is related to the "personal name" pull-down menu, the pull-down menu "seated," "in conference" and "at home" is related with the attribute interpretation list ATL, and the pull-down menu of "pop-up" and "mail" shows the action to be executed by the directory server DRS.

Figure 32:
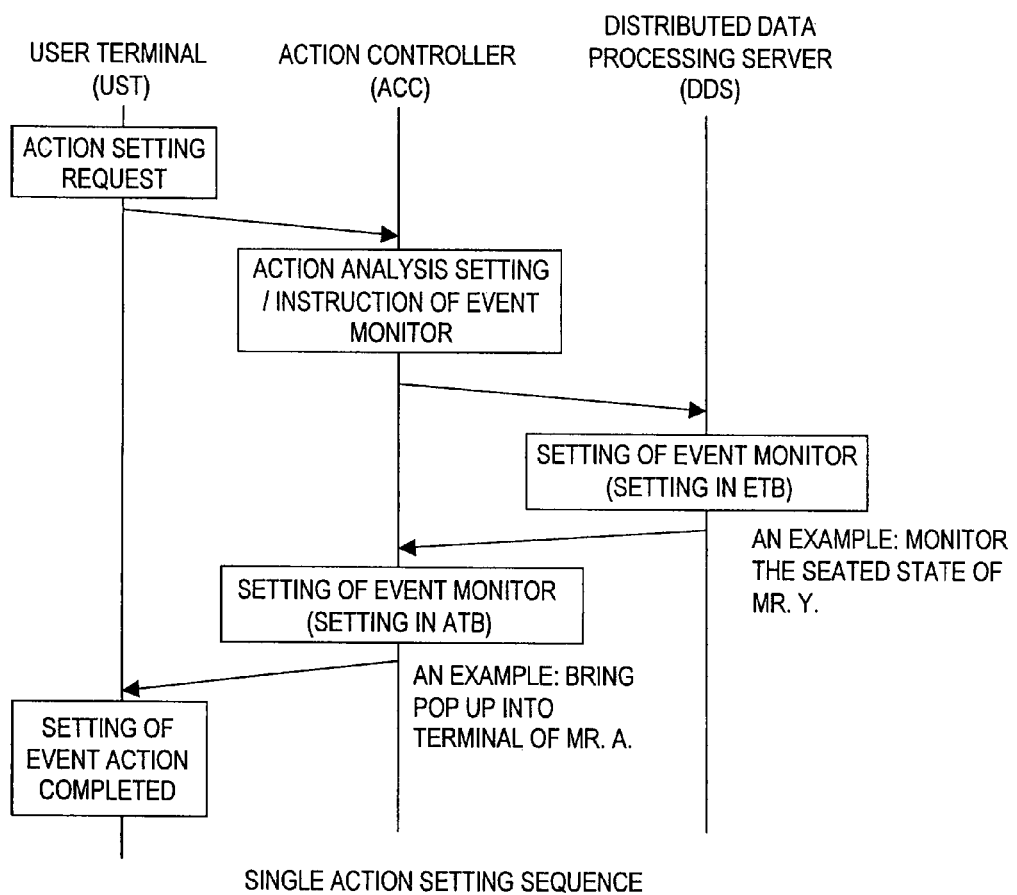
FIG. 32 is a time chart showing the sequence of setting a single action.

A single action to be executed following a single event as described above will be called "a single action," as is shown in FIG. 32. In other words, a request for an action setting is presented by the user terminal UST to the action controller ACC of the directory server DRS, an action analysis and an instruction for monitoring an event are created in the action controller ACC, and an event table ETB will be defined in the event-action controller EAC of the distributed data processing server DDS. Then, the action manager AMG of the action controller ACC instructs the event receiver ERC to monitor the event set above (data ID=X2). By this action, the action controller ACC informs the user terminals UST that a series of action settings have been completed.

<Execution of Actions>

Figure 33:
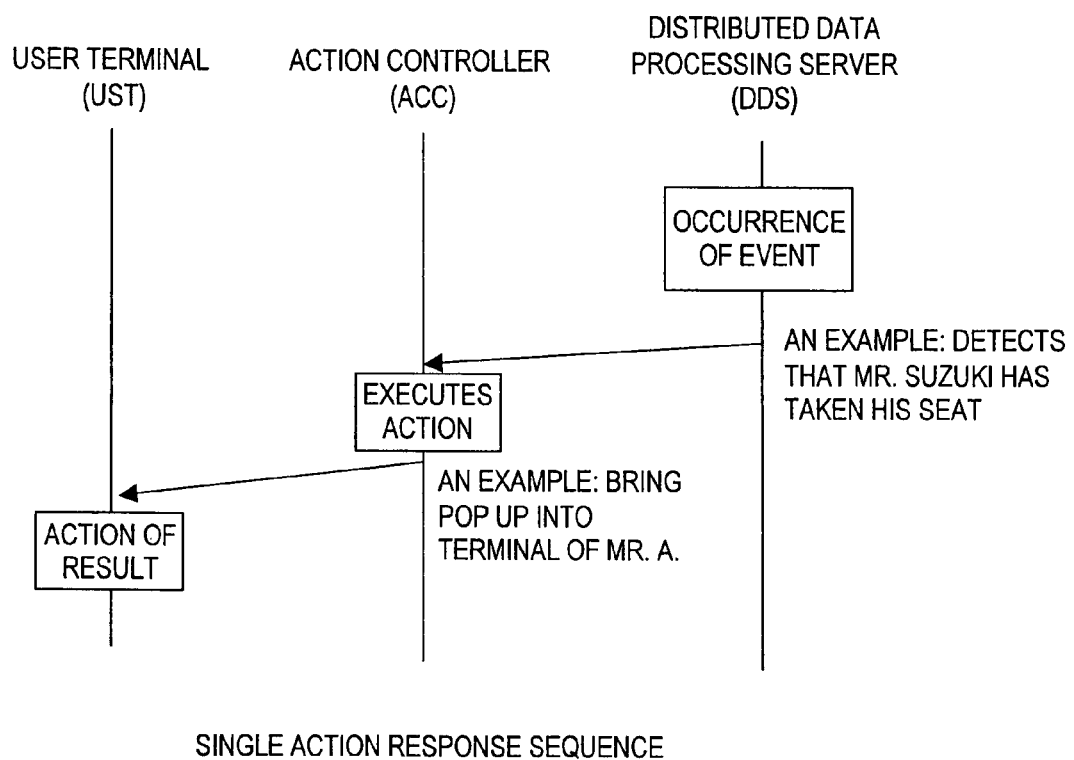
FIG. 33 is a time chart showing the sequence of responding a single action.
Figure 36:
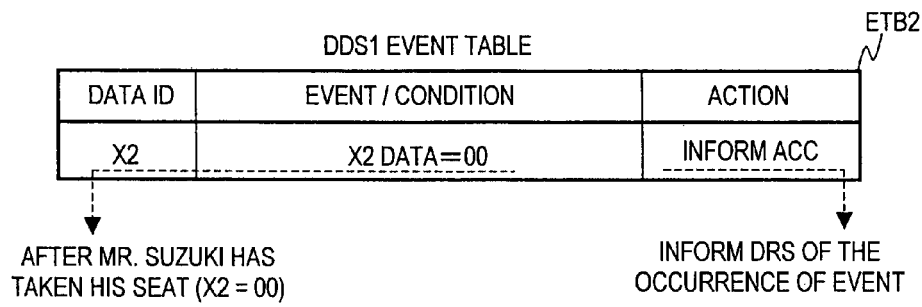
FIG. 36 is a detailed description showing entries in the event table of the distributed data processing server DDS-1.

FIG. 33 is a time chart showing the execution of actions set in FIGS. 28 and 29 above.

When the measured data value of the sensor nodes changes to "00", which is the condition of event occurrence, meaning that Mr. X has taken seat has been determined, the distributed data processing server DDS-1 generates an event notice relating to the data ID=X2.

This event occurrence will be notified by the distributed data processing server DDS to the directory server DRS and will be received by the even receiver ERC shown in FIG. 26.

The action manager AMG of the directory server DRS retrieves the action table ATB shown in FIG. 31 from the event ID received and judges whether there is any pertinent action or not. As the ID=X2 event received is defined in the action table ATB, the action manager AMG informs the action executer ACE on the action and parameters of the action table ATB.

The action executer ACE sends a pop-up notice to the user terminal UST having an IP address A that is designated by the action manager AMG.

The pop-up notice is sent to the user UST with IP address A enabling to confirm that Mr. X has taken his seat.

<Setting and Execution of Action from Plural Events>

FIGS. 28, 29 and 33 describe the case of taking an action for an event that has occurred. However, as shown in FIGS. 34 to 39, it is possible to set the case of taking an action when two events have occurred.

FIGS. 34 and 35 are screens for requesting the setting for an action triggered by plural events occurrence. In this screen for requesting setting, a pull-down menu wherein the state of "being seated" and the like for two personal name columns can be chosen is defined. The conditions for the event corresponding these two personal names are, like FIGS. 28 and 29 above, related with the real-world model list MDL and the attribute interpretation list ATL of the real-world model table MTB.

Moreover, a pull-down menu for setting the Boolean expression (AND, OR) of the event conditions of these two persons will be added.

Just like the single action mentioned above, the action to be executed by the directory server DRS (pop-up notice, mail transmission) and the parameters column (address and the like) required for the execution of the actions will be set.

Here, we will describe the case of action of sending Email when the event of the distributed data processing server DDS-1 of "Mr. Suzuki taking seat" has occurred and the event of the distributed data processing server DDS-2 of "Mr. Tanaka taking seat" has also occurred.

To begin with, the event of "Mr. Suzuki taking seat" will be set in the same way as FIGS. 28 and 29 above, and the event shown in FIG. 36 will be set in the event table ETB of the distributed data processing server DDS-2 which monitors the taking seat of Mr. Suzuki. The time chart of setting the action table at this time will be shown in FIG. 39.

Figure 37:
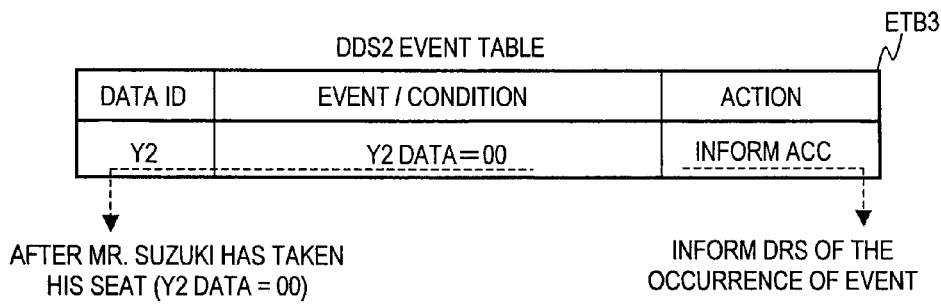
FIG. 37 is a detailed description showing entries in the event table of the distributed data processing server DDS-2.

Then, with regard to the event of "Mr. Tanaka taking seat," like FIGS. 28 and 29 shown above, the sensor node ID=Y2 for detecting Mr. Tanaka's taking seat will be the data ID, and "00" showing the taking seat from the attribute interpretation list ATL will be the condition of the event, and the action of informing the action controller ACC of the directory server DRS when this event condition has been met will be set in the event table ETB of the distributed data processing server DDS-2 as shown in FIG. 37.

Figure 38:
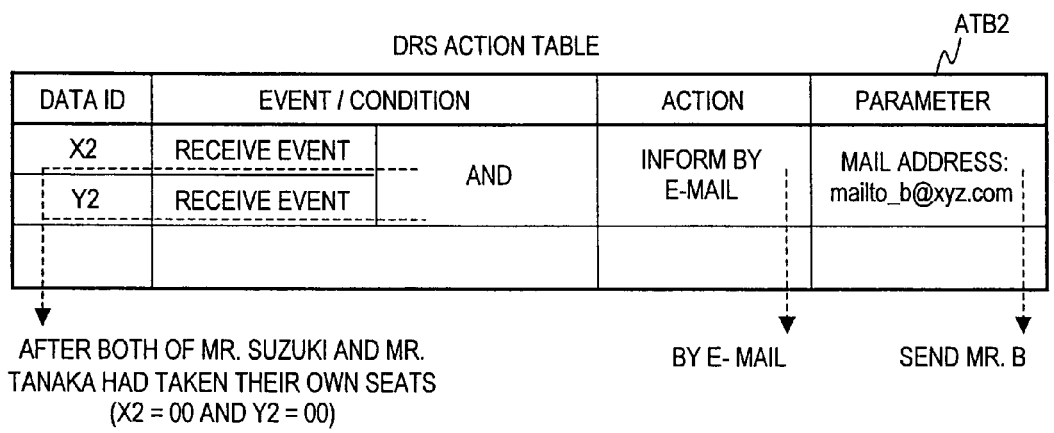
FIG. 38 is a detailed description showing entries in the action table of the directory server DRS.
Figure 39:
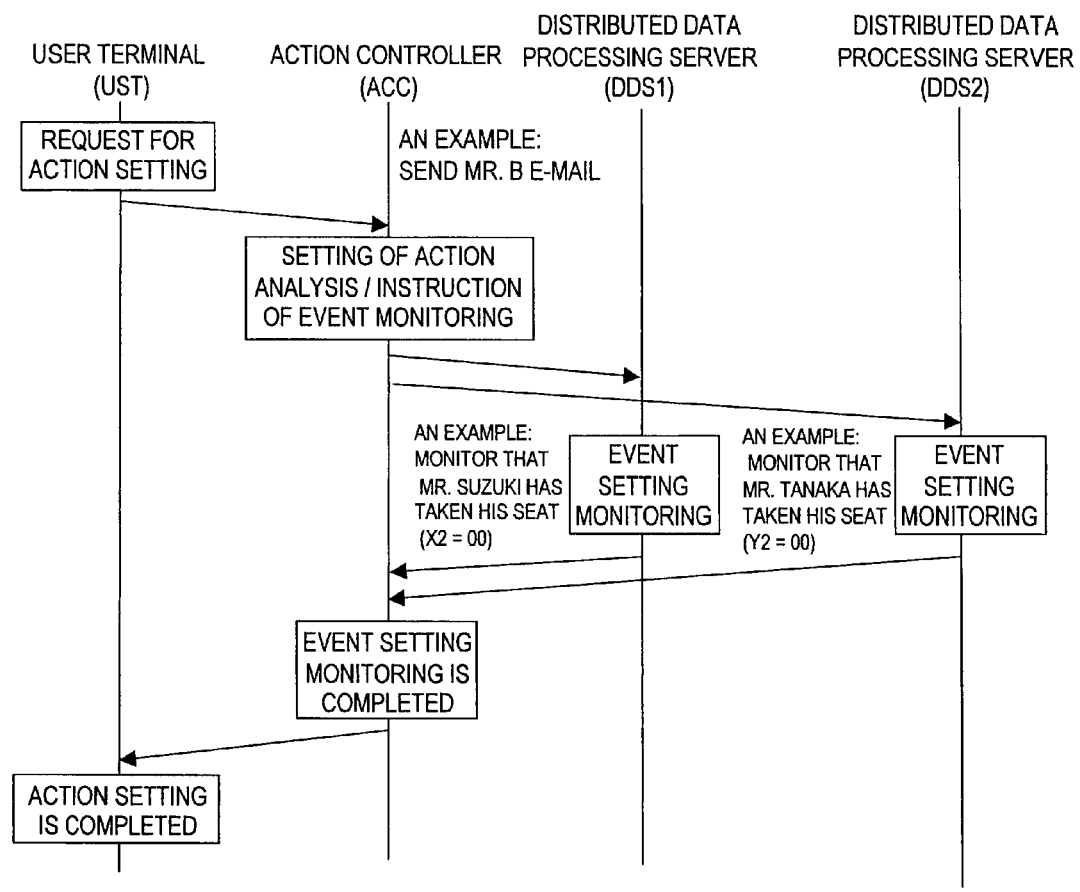
FIG. 39 is a time chart showing the sequence of setting an action with plural events.

In the action controller ACC of the directory server DRS, as shown in FIG. 38, two conditions will be combined by the Boolean expression of "AND" in the action table ATB and will be set.

Regarding the two conditions of the action table ATB combined by "AND," "Email transmission" will be set in the action column and the address of the addressee will be set in the parameter column.

Like FIG. 32 above, requests for setting the action related with Mr. Suzuki's seating and Mr. Tanaka's seating are presented from the user terminal UST to the action controller ACC, and a request for setting is presented from the event monitor instructor EMN to the distributed data processing server DDS-1 to inform the event when the measured data of the sensor node with a data ID=X2 has satisfied the prescribed condition (Mr. Suzuki taking place), and a request for setting is presented from the event monitor instructor EMN to the distributed data processing server DDS-2 to inform the event when the measured data of the sensor node with a data ID=Y2 has met the prescribed condition (Mr. Tanaka taking place).

In the distributed data processing servers DDS-1 and 2, new events are added to the respective event table ETB, and the event condition parser EVM of each distributed data processing server DDS-1 and 2 start monitoring events for the measured data.

In the action manager AMG of the action controller ACC, the event receiver ERC is instructed to monitor the events with data ID=X2 and Y2 and the setting action is completed.

Figure 40:
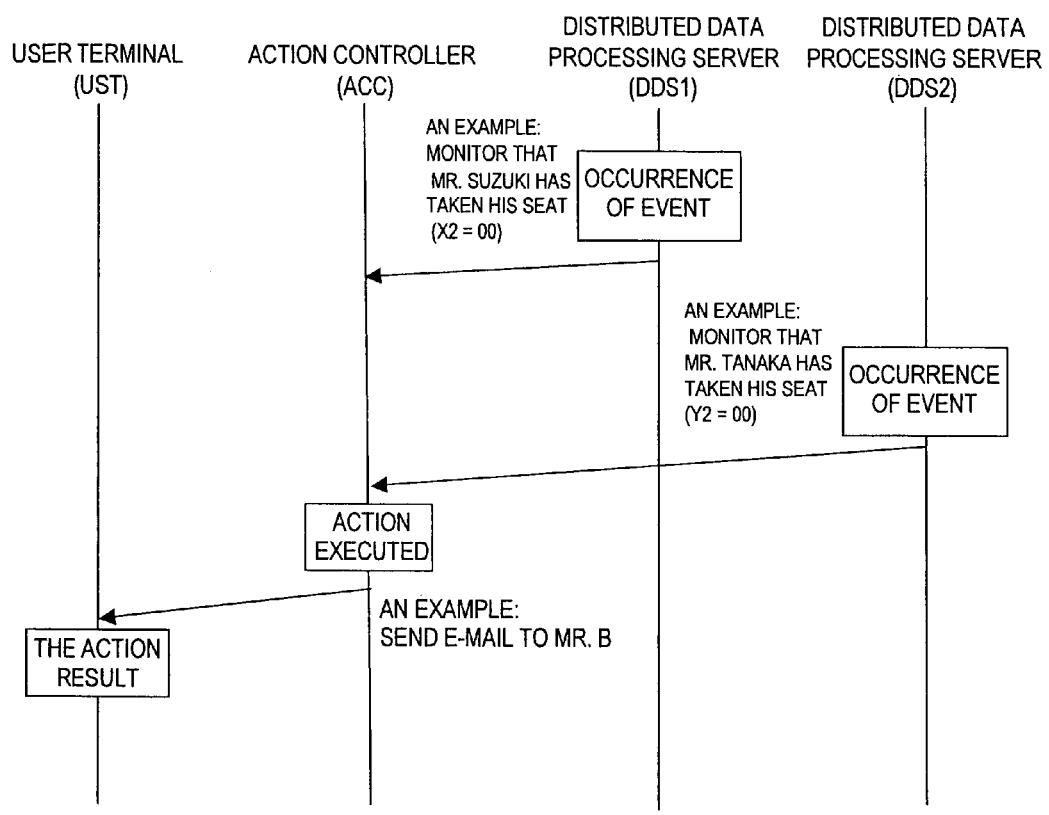
FIG. 40 is a time chart showing the sequence of responding plural events.

Then, FIG. 40 is a time chart showing how the actions are executed.

At the beginning, the distributed data processing server DDS-1 generates the events of data ID=X2 as Mr. Suzuki takes his seat. While the action controller ACC receives the event with data ID=X2, the action table ATB, being unable to execute any action until Mr. Tanaka takes his seat, withholds any relevant action.

Then, the distributed data processing server DDS-2 generates the events of data ID=Y2 as Mr. Y takes his seat. The action controller ACC receives the event of the data ID=Y2, and as the AND condition of the data ID=X2 and Y2 is satisfied in the action table ATB, the action is executed and the Email is transmitted to the predetermined mail address.

In this way, actions can be executed on the condition that plural events occur, and responses necessary for the user can be obtained from a large number of sensors. Accordingly, even if there are a huge number of sensor nodes, the users can detect almost in real time the desired information (or changes in information) and the information of the sensor nodes can be used effectively.

Second Embodiment

FIGS. 41 to 45 indicate the case where single actions are executed in the distributed data processing servers DDS. An action executer ACE is added to the event action controller EAC of the distributed data processing server DDS in FIG. 9, the event table ETB shown in FIG. 9 is replaced by the event action table EATB. The rest of the structure is the same as the first embodiment.

Figure 41:
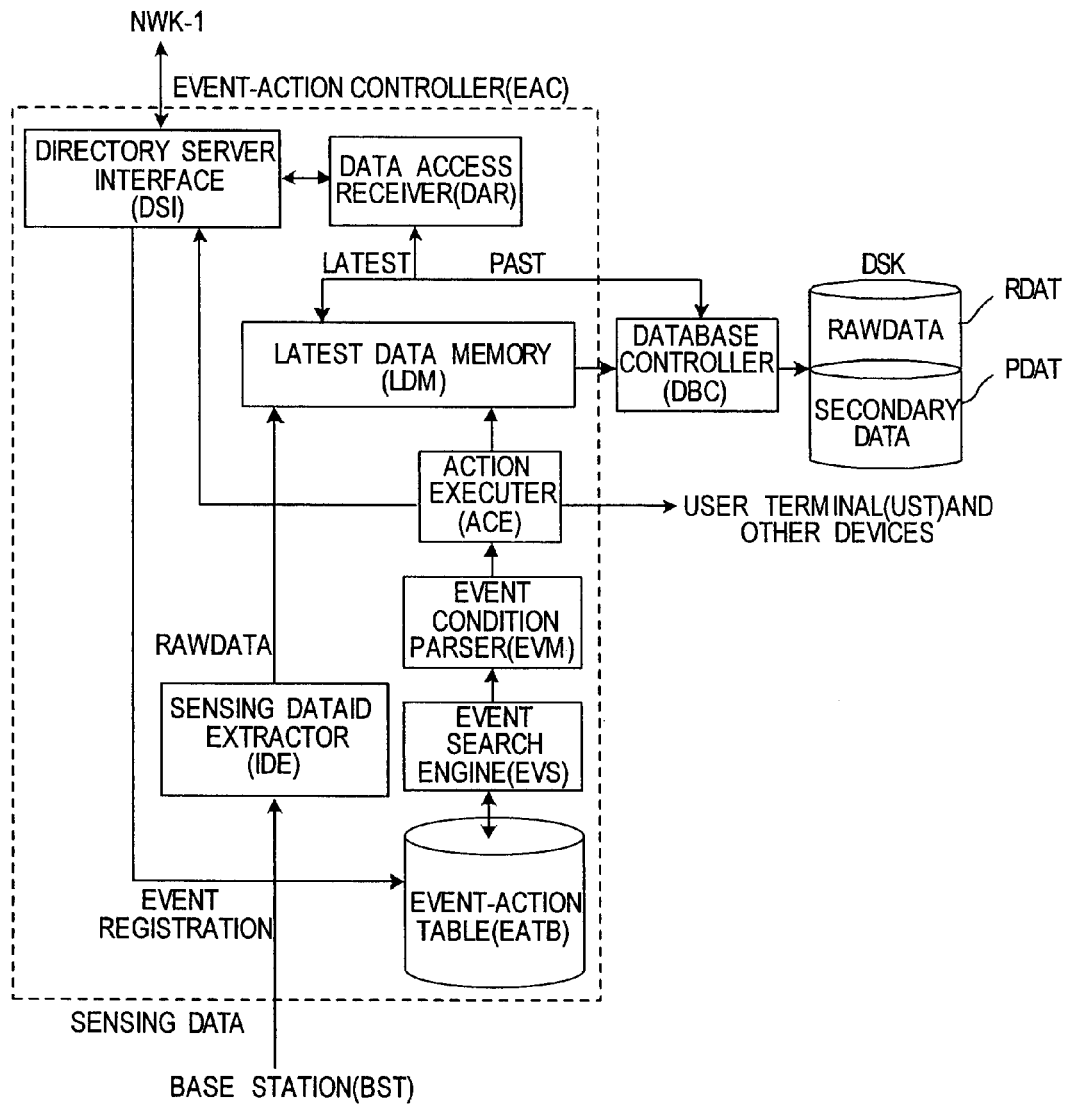
FIG. 41 is a block diagram showing the event-action controller of the distributed data processing server DDS representing the second embodiment.

In FIG. 41, the event action controller EAC of the distributed data processing server DDS includes an event action table EATB for relating the measured data collected from the base stations BST with the events and actions through the directory server interface DSI.

As FIG. 43 shows, each record of the event-action table EATB includes data ID given to the measured data allocated to each sensor node, an event contents column indicating the conditions on the measured data for generating events, an action column indicating the details of the action executed by the distributed data processing server DDS when an event occurs, a parameter column for storing the values necessary for executing an action, a data holder DHL for determining whether the measured data will be stored in the database DB or not when an event occurs.

For example, in the figure, the measured data having data ID=X1 are set in such a way that when their value is "02" Email will be transmitted to the address specified in the parameter column. The measured data will not be written in the disk drive DSK even if the condition is met when an event occurs.

In the distributed data processing server DDS, the measured data received from the base station BST is first of all received by the sensing data ID extractor IDE, the ID allocated to each sensor node is extracted from the measured data, and this ID will be the data ID. In addition, the sensing data ID extractor IDE will send the measured data to the latest data memory LDM.

The extracted data ID will be sent to the event search engine EVS to search the event action table EATB. If a record whose data ID matches is found, the event entry of the record and the measured data will be sent to the event condition parser EVM.

The event condition parser EVM compares the value of measured data and the event entry EVT, and if they meet the conditions they will be sent to the action executer ACE. And the action executer ACE will notice the event occurrence to the latest data memory LDM and the database controller DBC.

The database controller DBC will write the data whose data holder DHL is YES in the event action table EATB in the disk drive DSK.

The data access receiver DAR is similar to the embodiment 1 described above, and if the access request is for the latest data, it will read the measured data matching the data ID contained in the access request from the latest data memory LDM and return the same to the directory server interface DSI.

Figure 44:
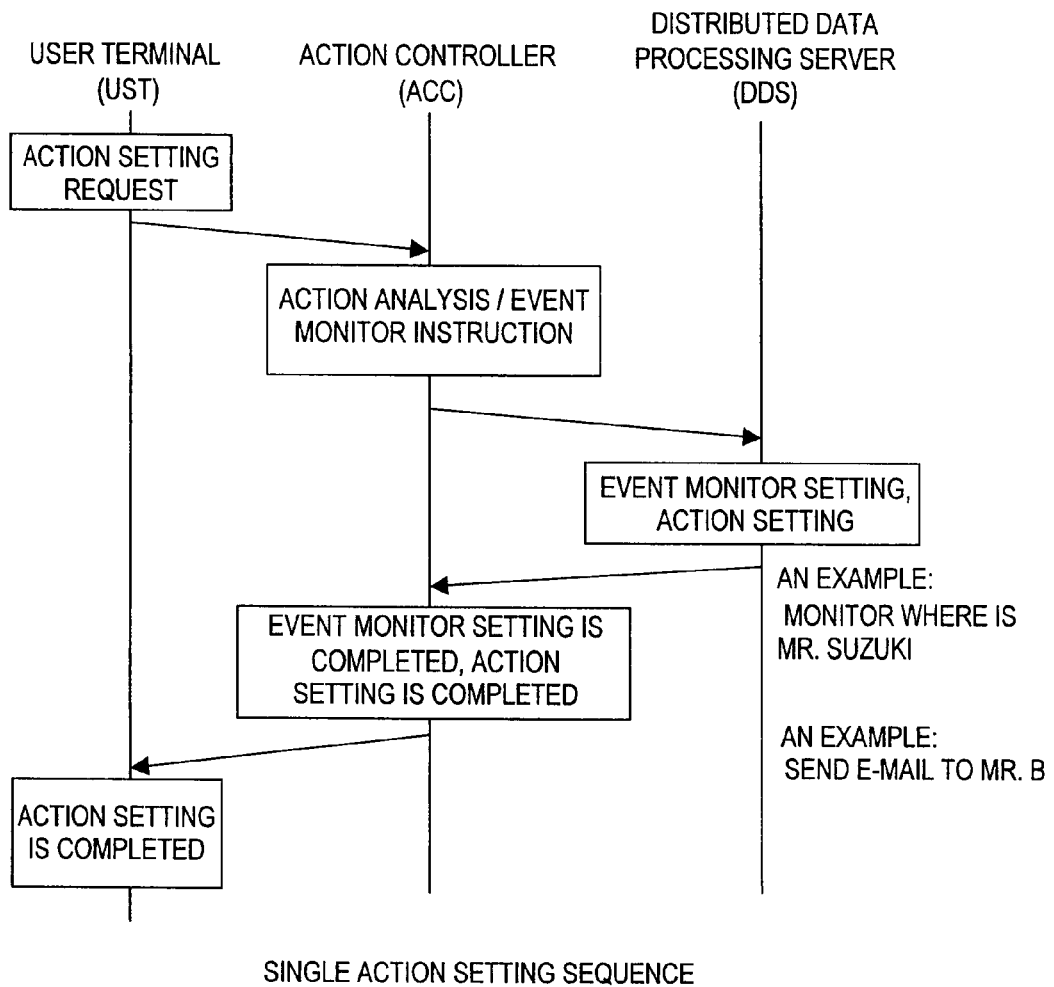
FIG. 44 is a time chart showing the sequence of setting actions.

FIG. 44 shows a time chart for setting actions in the distributed data processing server DDS and FIG. 42 shows an example of interface sent by the action controller ACC of the directory server DRS to the user terminal UST for setting actions. Incidentally, at the time of setting a single action, the directory server DRS communicates with the distributed data processing servers DDS and sets the request for setting actions received from the user terminals UST to the distributed data processing server DDS corresponding to the sensor node ID designated.

To begin with, the user (or the service manager) accesses the action controller ACC of the directory server DRS from the user terminal UST and the like and requests to set actions. As an example of actions, we will examine the case of, as FIG. 28 shows, setting actions of monitoring the position of Mr. X and upon his entry into the meeting room A, sending a pop-up notice to the user terminal UST with an IP address: A.

Upon receipt of this request for setting action, the action receiver ARC of the action controller ACC requests the action analyzer AAN to set the action. The action analyzer AAN chooses the data ID of the object of monitoring from, for example, Mr. X's position, and decides in which condition of the measured data of the sensor node the event will occur. Here, in order to convert the real-world event of "Mr. X taking his seat" into a data ID, it will search the model of "Mr. X taking his seat" by referring to the real-world model list MDL and the attribute interpretation list ATL of the real-world model table MTB.

Here, as shown in FIG. 29, if Mr. X=Mr. Suzuki, the model has already been defined in the real-world model table MTB, the information link pointer for storing the data ID=X2 and the data (distributed data processing server DDS1) will be acquired from the lists mentioned above MDL and ATL.

Then, the action manager AMG judges whether the request presented by the user terminal UST is for a single action or not, and if it is for a single action, it will set in such a way that the requested action may be executed in the distributed data processing server DDS which holds the information mentioned above.

In order to monitor the occurrence of events linked with "Mr. X's position" and execute an action related with the event occurrence in a distributed data processing server DDS, an instruction will be sent out to the distributed data processing server DDS that manages the sensor nodes selected as mentioned above to monitor whether the event "Mr. X' position" matches with the condition "meeting room A". The action controller ACC of the directory server DRS sets the action of "sending Email to the user with a mail address: mailto_b@xyz.com" in the event-action table EATB in the distributed data processing server DDS, and sets the sensor node ID mentioned above as the event ID for executing the action.

The distributed data processing server DDS having received the instruction from the action manager AMG of the directory server DRS registers, as shown in FIG. 43, the condition "02" for the meeting room A acquired from the attribute interpretation list ATL relating to the data ID=X1 acquired from the real-world model list MDL and the Email address mentioned above for the recipient of the action.

The action of registering by the action manager AMG in the distributed data processing server DDS will be set, as shown in FIG. 43, in such a way that the action of sending Email may be executed to the address entered in the parameter column when the event whose data ID=X1 occurs.

Thus, when the user terminal UST presents a request for setting a single action, the action controller ACC of the directory server DRS sets values on the corresponding distributed data processing server DDS instead of setting values in its own action table ATB so that both events and actions may be set in the event-action table EATB of the distributed data processing server DDS.

Figure 45:
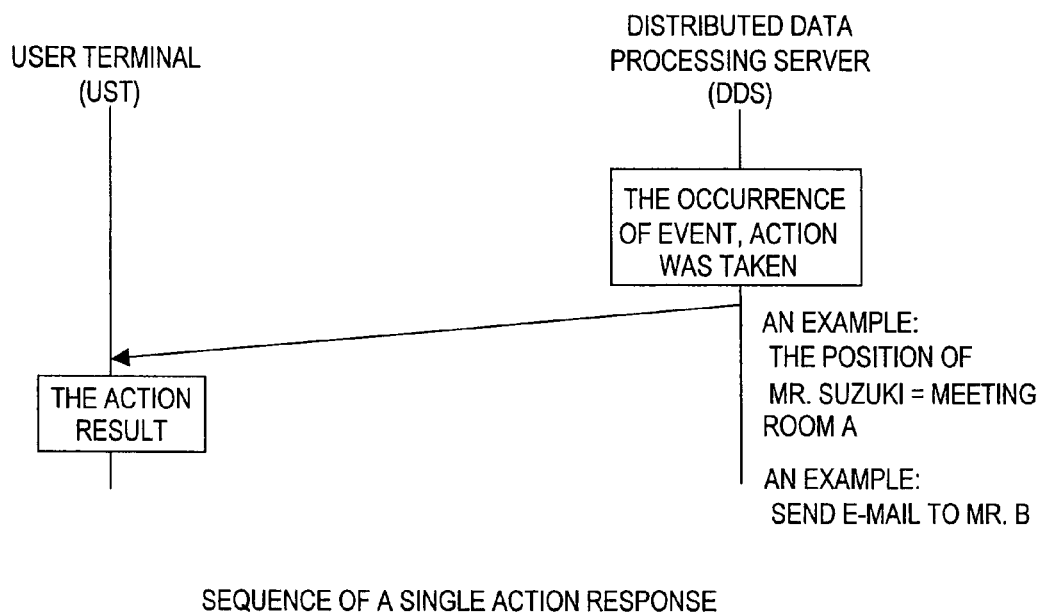
FIG. 45 is a time chart showing the sequence of responding to plural events and actions.

The events and actions will be executed in the distributed data processing server DDS as shown in FIG. 45. When Mr. X enters the meeting room, the value whose data ID=X1 will be "02" and the event occurrence defined in the event-action table EATB shown in FIG. 43 will be monitored and the resulting actions will be taken. As a result of the execution of the action, the entry of Mr. X into the meeting room A will be notified to the prescribed Email address.

In this case, the directory server DRS only sets actions to the distributed data processing server DDS, and it is not necessary to monitor the actual occurrence of events. Accordingly, the collection of data and the execution of single action may be entrusted to the distributed data processing servers DDS, and the directory server DRS only does tasks such as monitoring the request for retrieval and actions with plural events from the user terminals UST. Therefore, when the number of requests for monitoring actions is very large, it is possible to prevent the loads of the directory server DRS from becoming excessively large and to operate the sensor network smoothly.

<First Variant>

Figure 46:
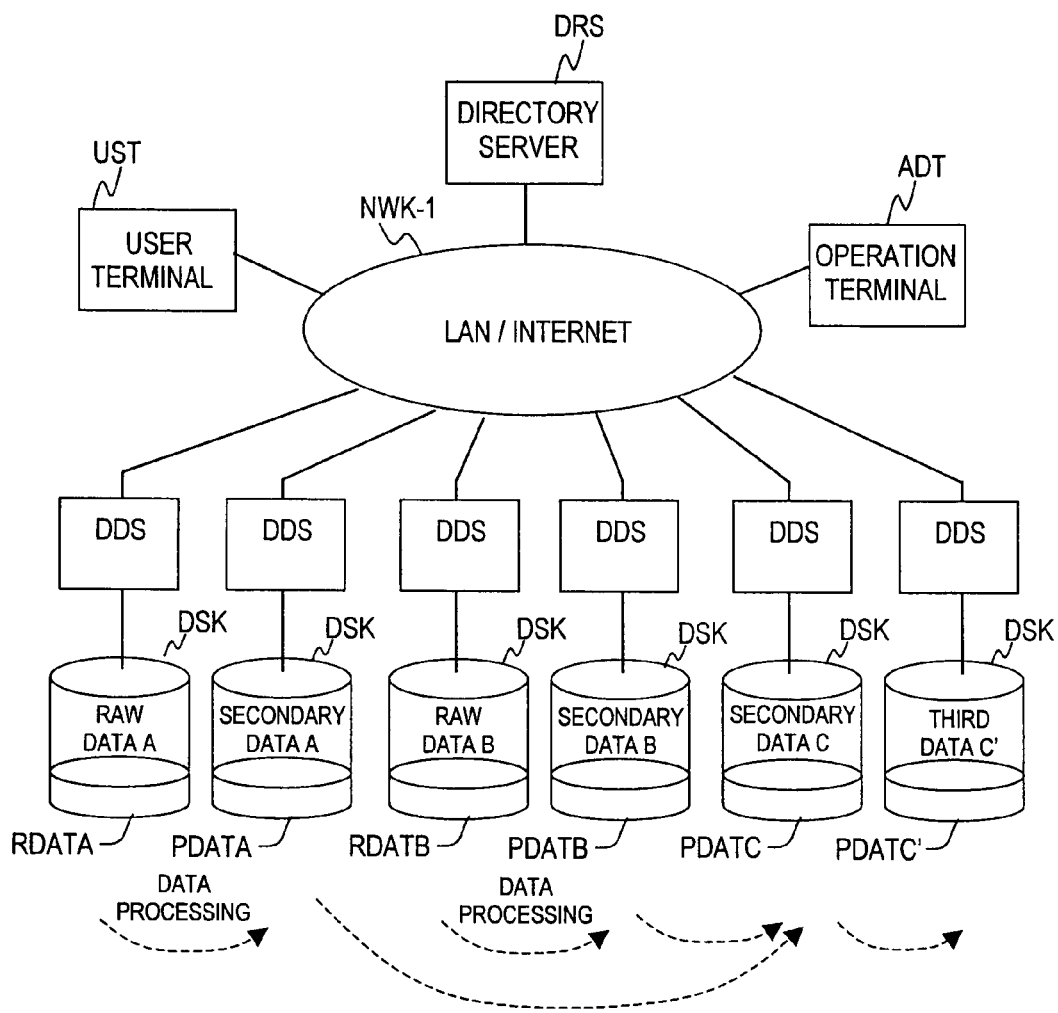
FIG. 46 is a block diagram showing the system of a sensor network representing a first variant.
Figure 47:
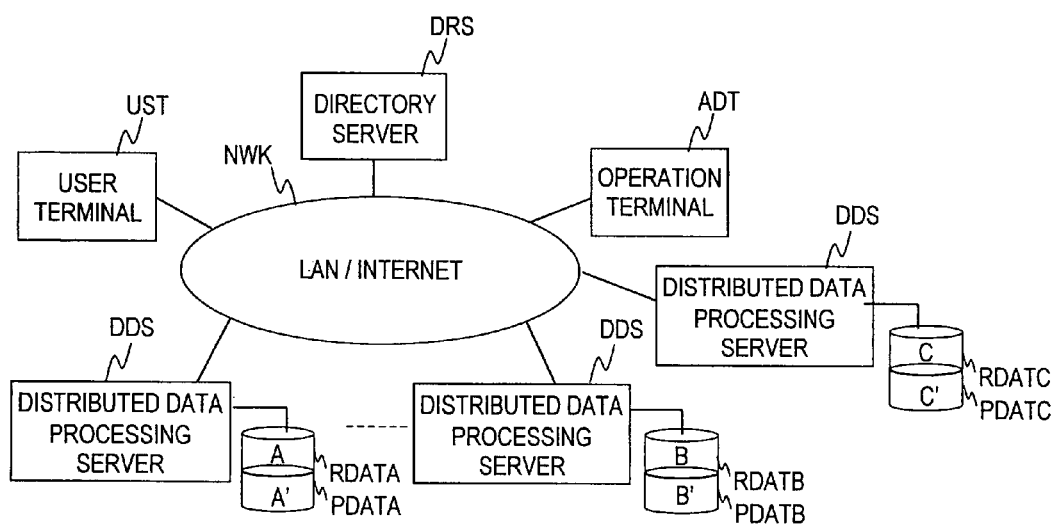
FIG. 47 is also a block diagram showing the system of a sensor network representing the first variant.

FIGS. 46 and 47 are block diagrams showing the first variant of the first or second embodiments described above. In this first variant, the measurements coming from certain sensor nodes are stored in the predetermined distributed data processing servers DDS as raw data A, while the measurements from other sensor nodes are stored in predetermined distributed data processing servers DDS as raw data B.

In each distributed data processing server DDS, the raw data A and B are respectively processed (e.g. mean value for the unit time and the like) and the results of processing are stored as data A and B respectively of the secondary directory server DR. The processing timing of the raw data A and B may be set as an action based on the predetermined conditions (passage of time) in the directory server DRS or each distributed data processing server DDS.

Each distributed data processing server DDS will calculate the third data C from the processed secondary data A and B as the specified action and store them as new secondary data in the specified distributed data processing server DDS. When this third data C are processed further, it will be stored as the tertiary data C'.

For example, supposing that the raw data A represents temperature and the raw data B represents humidity, the secondary data A and B will represent respectively the average temperature and the average humidity for a unit length of time. In addition, the index of discomfort calculated from the average temperature and the average humidity can be expressed as third data C, and the average value per unit length of time of the third data C can be expressed as tertiary data C'.

In the first or second embodiment described above, various events taking place are represented by measured data. However, it is possible to indicate the occurrence of events and to carry out actions by using the above-mentioned secondary data A and B, the third data C and the tertiary data C'.

And as FIG. 47 shows, measured data (raw data) and secondary data are stored in a single distributed data processing server DDS. Incidentally, in this case, the secondary data A and B may be transmitted to a different distributed management server from the distributed management server which manages the secondary data. This enables to handle the secondary data A and B as raw data, and the tertiary data C' as secondary data.

<Second Variant>

Figure 48:
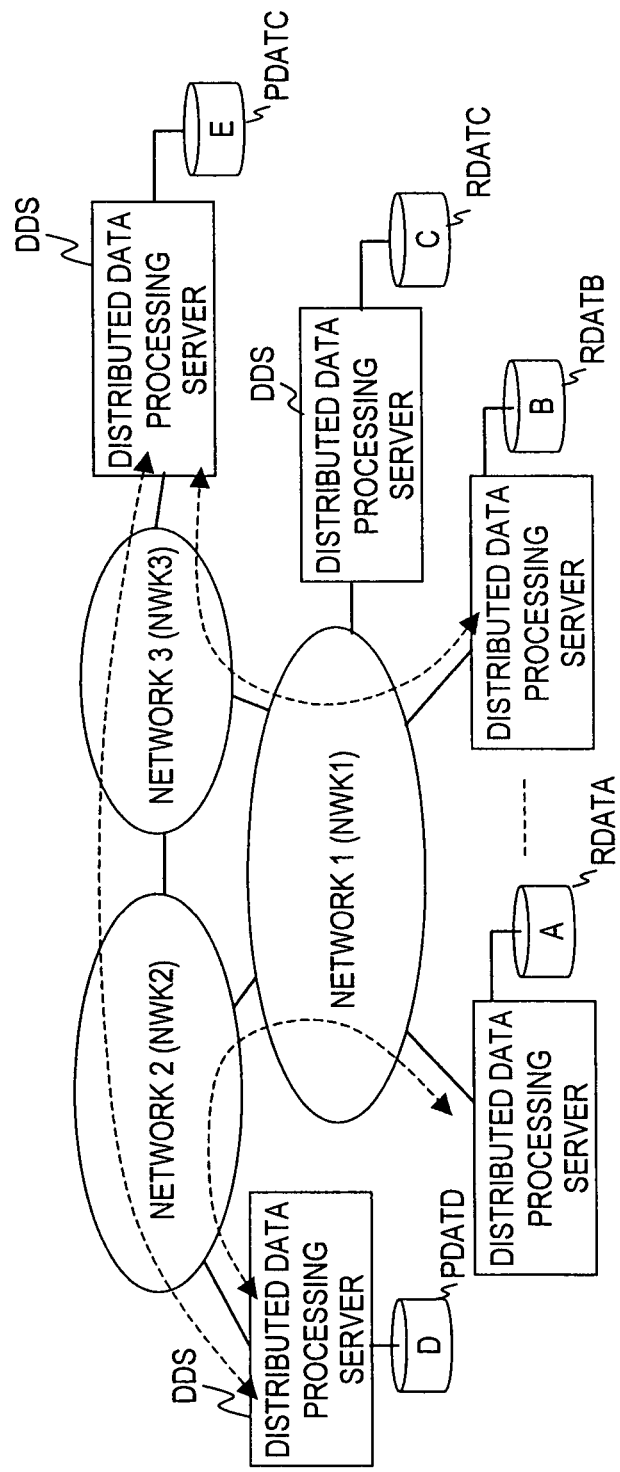
FIG. 48 is a block diagram showing the system of a sensor network representing a second variant.

FIG. 48 shows the second variant, wherein the network to which the distributed data processing server DDS is connected in the first or second embodiment is divided into a plurality, the other aspects of the configuration remaining the same as the first or second embodiment.

In this variant, the network to which the distributed data processing server DDS is connected may be set to be different according to the frequency of referring the measured data and the like.

The measured data or secondary data whose frequency of reference from the directory server DRS (not shown) is high is connected with the same network 1 as the directory server DRS. The distributed data processing server DDS storing secondary data D whose reference frequency is relatively low is connected with the network 2, and the distributed data processing server DDS storing the secondary data E that is hardly referred is connected with the network 3. And all the networks 1 to 3 are respectively connected with a gateway not shown.

Such a disposition of the distributed data processing servers DDS will enable to improve the access speed to the distributed data processing server DDS having data with a high frequency of reference.

<Third Variant>

In the first or second embodiment described above, the data link pointer corresponding to the model name was set as the information link pointer in the real-world model list MDL of the directory server DRS. However, when the response must be quick, the latest value of data may be stored with the information link pointer.

In this case, the data traffic between the directory server DRS and the distributed data processing server DDS increases as the number of objects increases. In view of the fact that, however, the data acquired from each sensor is collected in a fixed frequency by the distributed data processing server DDS, the load for the network NWK-1 increases as compared with the embodiments described above, and yet it will be possible to respond quickly to the request for data from the user terminal UST, and further improvement in response can be expected.

As described above, according to this invention, the directory server manages collectively the location of data, plural distributed data processing servers are provided and are distributed on the network for collecting the data from the sensor nodes in real time. Therefore, it is possible to access data received from a huge number of sensor nodes quickly and easily. Thus, this invention can be applied to a sensor network having a large number of sensor nodes.

While the present invention has been described in detail and pictorially in the accompanying drawings, the present invention is not limited to such detail but covers various obvious modifications and equivalent arrangements, which fall within the purview of the appended claims.

What is claimed is:

1. A data retrieval method for retrieving, at user terminals, data transmitted from a plurality of sensor nodes, the data retrieval method comprising operations of:
storing raw data transmitted from the plurality of sensor nodes, in distributed servers, wherein the raw data is before conversion into user-interpretable data, and wherein the raw data includes an attribute information concerning at least one of: a place; a temperature; a name; and, a number of persons,
using a management server connected through a network with the distributed servers and the user terminals, the management server containing correspondence information to correspond model names identifying a real-world event of a real-world model, with information link pointers pointing to at least one portion of the raw data which corresponds to the model names, respectively,
using the management server to accept data reference requests from the user terminals, wherein an operation to accept a data reference request from a user terminal includes:
accepting key words from the user terminal,
responding to the user terminal with candidate ones of the model names possibly corresponding to the key words, and
accepting at least one model name chosen by the user terminal from among the candidate ones of the model names, as the data reference request,
using the management server to acquire relevant raw data, from among the raw data stored in the distributed servers, based on the data reference request from the user terminal and the model names and information link pointers stored in the management server, and to respond with the data converted into the user-interpretable data which is in a form understandable to a user, to the user terminal, and
wherein the operation to respond to the user terminal with the data converted into the user-interpretable data includes:
converting the relevant data acquired into information understandable for a user, based on a previously set conversion technique which is pre-stored in an attribute interpretation list, and
responding to the user terminal with the converted data, and
wherein as to the conversion technique pre-stored in the attribute interpretation list:
if the relevant raw data acquired includes the attribute information which is preset for interpretation as a subject place, the relevant data acquired is converted into information corresponding to the subject place, in a converted form which is understandable by a user,
if the relevant raw data acquired includes the attribute information which is preset for interpretation as a subject temperature, the relevant data acquired is converted into information corresponding to the subject temperature, in a converted form which is understandable by a user,
if the relevant raw data acquired includes the attribute information which is preset for interpretation as a subject name, the relevant data acquired is converted into information corresponding to the subject name, in a converted form which is understandable by a user, and
if the relevant raw data acquired includes the attribute information which is preset for interpretation as a subject number of persons, the relevant data acquired is converted into information corresponding to the subject number of persons, in a converted form which is understandable by a user.

2. The data retrieval method for sensing data according to claim 1, wherein
the operation of accepting data reference requests from the user terminal comprises:
presenting a model name for every element common to the model name to the user terminal, and
accepting the model names chosen by the user terminal as the data reference requests.

3. The data retrieval method for sensing data according to claim 1, wherein
the operation of storing the raw data transmitted from the plurality of sensor nodes, in distributed servers, comprises:
updating a latest data memory of the distributed servers with the raw data, and
storing only raw data meeting previously set conditions in disk drives of the distributed servers.

4. A non-transitory computer-readable storage embodying a program for acquiring data from distributed servers for storing data transmitted from a plurality of sensor nodes, based on data reference requests accepted from user terminals, the program effecting processes of:
storing raw data transmitted from the plurality of sensor nodes, in distributed servers, wherein the raw data is before conversion into user-interpretable data, and wherein the raw data includes an attribute information concerning at least one of: a place; a temperature; a name; and, a number of persons,
using a management server connected through a network with the distributed servers and the user terminals, the management server containing correspondence information to correspond model names identifying a real-world event of a real-world model, with information link pointers pointing to at least one portion of the raw data which corresponds to the model names, respectively,
using the management server to accept data reference requests from the user terminals, wherein an operation to accept a data reference request from a user terminal includes:
accepting key words from the user terminal, responding to the user terminal with candidate ones of the model names possibly corresponding to the key words, and accepting at least one model name chosen by the user terminal from among the candidate ones of the model names, as the data reference request, using the management server to acquire relevant raw data, from among the raw data stored in the distributed servers, based on the data reference request from the user terminal and the model names and information link pointers stored in the management server, and to respond with the data converted into the user-interpretable data which is in a form understandable to a user, to the user terminal, and wherein the operation to respond to the user terminal with the data converted into the user-interpretable data includes:

converting the relevant data acquired into information understandable for a user, based on a previously set conversion technique which is pre-stored in an attribute interpretation list, and responding to the user terminal with the converted data, and wherein as to the conversion technique pre-stored in the attribute interpretation list:

if the relevant raw data acquired includes the attribute information which is preset for interpretation as a subject place, the relevant data acquired is converted into information corresponding to the subject place, in a converted form which is understandable by a user, if the relevant raw data acquired includes the attribute information which is preset for interpretation as a subject temperature, the relevant data acquired is converted into information corresponding to the subject temperature, in a converted form which is understandable by a user, if the relevant raw data acquired includes the attribute information which is preset for interpretation as a subject name, the relevant data acquired is converted into information corresponding to the subject name, in a converted form which is understandable by a user, and if the relevant raw data acquired includes the attribute information which is preset for interpretation as a subject number of persons, the relevant data acquired is converted into information corresponding to the subject number of persons, in a converted form which is understandable by a user.

5. The non-transitory computer-readable storage according to claim 4, wherein the process of accepting the data reference requests from the user terminals comprises:

a process of presenting a model name for every element common to the model names to the user terminals, and a process of accepting the model names chosen by the user terminals as the data reference requests.

6. A data retrieval method for retrieving, at user terminals, data transmitted from a plurality of sensor nodes, the data retrieval method comprising operations of:

storing raw data transmitted from the plurality of sensor nodes, in distributed servers, wherein the raw data is before conversion into user-interpretable data, and wherein the raw data includes an attribute information concerning at least one of: a place; a temperature; a name; and, a number of persons, using a management server connected through a network with the distributed servers and the user terminals, the management server containing correspondence information to correspond key-word-based model names identifying a real-world event of a real-world model, with information link pointers pointing to at least one portion of the raw data which corresponds to the key-word-based model names, respectively, using the management server to accept data reference requests from the user terminals, wherein an operation to accept a data reference request from a user terminal includes:

accepting key words from the user terminal, responding to the user terminal with candidate ones of the key-word-based model names possibly corresponding to the key words, and accepting at least one key-word-based model name chosen by the user terminal from among the candidate ones of the key-word-based model names, as the data reference request, using the management server to acquire relevant raw data, from among the raw data stored in the distributed servers, based on the data reference request from the user terminal and the key-word-based model names and information link pointers stored in the management server, and to respond with the data converted into the user-interpretable data which is in a form understandable to a user, to the user terminal, and wherein the operation to respond to the user terminal with the data converted into the user-interpretable data includes:

converting the relevant data acquired into information understandable for a user, based on a previously set conversion technique which is pre-stored in an attribute interpretation list, and responding to the user terminal with the converted data, and wherein as to the conversion technique pre-stored in the attribute interpretation list:

if the relevant raw data acquired includes the attribute information which is preset for interpretation as a subject place, the relevant data acquired is converted into information corresponding to the subject place, in a converted form which is understandable by a user, if the relevant raw data acquired includes the attribute information which is preset for interpretation as a subject temperature, the relevant data acquired is converted into information corresponding to the subject temperature, in a converted form which is understandable by a user, if the relevant raw data acquired includes the attribute information which is preset for interpretation as a subject name, the relevant data acquired is converted into information corresponding to the subject name, in a converted form which is understandable by a user, and if the relevant raw data acquired includes the attribute information which is preset for interpretation as a subject number of persons, the relevant data acquired is converted into information corresponding to the subject number of persons, in a converted form which is understandable by a user.

7. A data retrieval method for retrieving, at user terminals, data transmitted from a plurality of sensor nodes, the data retrieval method comprising operations of:

storing raw data transmitted from the plurality of sensor nodes, in distributed servers, wherein the raw data is before conversion into user-interpretable data, and wherein the raw data includes an attribute information concerning at least one of: a place; a temperature; a name; and, a number of persons, using a management server connected through a network with the distributed servers and the user terminals, the management server containing correspondence information to correspond combined-attribute model names identifying a real-world event of a real-world model, with information link pointers pointing to at least one portion of the raw data which corresponds to the combined-attribute model names, respectively, using the management server to accept data reference requests from the user terminals, wherein an operation to accept a data reference request from a user terminal includes:

accepting key words from the user terminal, responding to the user terminal with candidate ones of the combined-attribute model names possibly corresponding to the key words, and accepting at least one combined-attribute model name chosen by the user terminal from among the candidate ones of the combined-attribute model names, as the data reference request, using the management server to acquire relevant raw data, from among the raw data stored in the distributed servers, based on the data reference request from the user terminal and the combined-attribute model names and information link pointers stored in the management server, and to respond with the data converted into the user-interpretable data which is in a form understandable to a user, to the user terminal, and wherein the operation to respond to the user terminal with the data converted into the user-interpretable data includes:

converting the relevant data acquired into information understandable for a user, based on a previously set conversion technique which is pre-stored in an attribute interpretation list, and responding to the user terminal with the converted data, and wherein as to the conversion technique pre-stored in the attribute interpretation list:

if the relevant raw data acquired includes the attribute information which is preset for interpretation as a subject place, the relevant data acquired is converted into information corresponding to the subject place, in a converted form which is understandable by a user, if the relevant raw data acquired includes the attribute information which is preset for interpretation as a subject temperature, the relevant data acquired is converted into information corresponding to the subject temperature, in a converted form which is understandable by a user, if the relevant raw data acquired includes the attribute information which is preset for interpretation as a subject name, the relevant data acquired is converted into information corresponding to the subject name, in a converted form which is understandable by a user, and if the relevant raw data acquired includes the attribute information which is preset for interpretation as a subject number of persons, the relevant data acquired is converted into information corresponding to the subject number of persons, in a converted form which is understandable by a user.

8. The data retrieval method for sensing data according to claim 1, wherein the model names are more specifically combined-attribute model names which each include plural attributes defining an event with respect to an object.

9. The non-transitory computer-readable storage according to claim 4, wherein the model names are more specifically combined-attribute model names which each include plural attributes defining an event with respect to an object.

10. The data retrieval method for sensing data according to claim 6, wherein the key-word-based model names are more specifically combined-attribute model names which each include plural attributes defining an event with respect to an object.

11. The data retrieval method for sensing data according to claim 7, wherein the combined-attribute model names each include plural attributes defining an event with respect to an object.

* * * * *